(12) United States Patent
Graif et al.

(10) Patent No.: US 10,496,562 B1
(45) Date of Patent: Dec. 3, 2019

(54) LOW LATENCY VIRTUAL GENERAL PURPOSE INPUT/OUTPUT OVER I3C

(71) Applicant: QUALCOMM Incorporated, San Diego, CA (US)

(72) Inventors: Sharon Graif, Zichron Yakov (IL); Lior Amarilio, Yokneam (IL); Tomer Rafael Ben-Chen, Amikam (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/101,836

(22) Filed: Aug. 13, 2018

(51) Int. Cl.
*G06F 13/24* (2006.01)
*G06F 13/42* (2006.01)
*G06F 13/16* (2006.01)
*G06F 13/364* (2006.01)

(52) U.S. Cl.
CPC ............ *G06F 13/161* (2013.01); *G06F 13/24* (2013.01); *G06F 13/364* (2013.01); *G06F 13/4291* (2013.01); *G06F 13/4282* (2013.01); *G06F 2213/0058* (2013.01); *G06F 2213/0064* (2013.01); *G06F 2213/24* (2013.01); *G06F 2213/36* (2013.01)

(58) Field of Classification Search
CPC ............................ G06F 13/24; G06F 13/4282
See application file for complete search history.

(56) References Cited

U.S. PATENT DOCUMENTS

| | | | |
|---|---|---|---|
| 6,895,459 B2 | 5/2005 | Hadwiger et al. | |
| 7,315,551 B2 | 1/2008 | Olson et al. | |
| 9,645,958 B2 | 5/2017 | Bosse et al. | |
| 2015/0100713 A1 | 4/2015 | Sengoku | |
| 2016/0224489 A1 | 8/2016 | Mishra et al. | |
| 2016/0285968 A1* | 9/2016 | Mishra | H04L 61/2007 |
| 2017/0039162 A1* | 2/2017 | Mishra | G06F 13/4282 |
| 2017/0075852 A1* | 3/2017 | Mishra | G06F 13/4282 |
| 2017/0104733 A1* | 4/2017 | Thanigasalam | G06F 13/1673 |
| 2017/0168966 A1* | 6/2017 | Mishra | H04W 4/80 |

* cited by examiner

*Primary Examiner* — Zachary K Huson
(74) *Attorney, Agent, or Firm* — Loza & Loza LLP

(57) ABSTRACT

Systems, methods, and apparatus are described for communicating virtual GPIO (VGI) information between multiple source devices and multiple consuming devices. A method for facilitating communication of VGI state over a serial bus includes determining that an in-band interrupt has been asserted on the serial bus while the serial bus is idle, participating in an exchange of VGI state when a first bit of a device address transmitted during bus arbitration associated with the in-band interrupt has a first value, receiving a plurality of bits of VGI state during the exchange of VGI state, including bits transmitted by multiple devices coupled to the serial bus, and mapping at least one bit in the plurality of bits of VGI state to a physical GPIO pin. Transmission of at least a second bit of the device address is suppressed when the first bit of a device address has the first value.

30 Claims, 13 Drawing Sheets

LOW LATENCY VIRTUAL GENERAL PURPOSE INPUT/OUTPUT OVER I3C

TECHNICAL FIELD

The present disclosure relates generally to serial communication and, more particularly, to facilitating communication of virtual general purpose input/output information generated at multiple source devices and directed to multiple destination devices over a serial communication link.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a serial bus or a parallel bus. In some instances, a shared data communication bus may be implemented using a standardized general-purpose serial interface such as the Inter-Integrated Circuit (I2C or I$^2$C) serial bus and the I3C interface defined by the Mobile Industry Processor Interface (MIPI) Alliance.

General purpose input/output (GPIO) provided in an integrated circuit (IC) device enable an IC designer to define and configure pins that may be customized for particular applications. For example, a GPIO pin may be programmable to operate as an output or as an input pin depending upon a user's needs. A GPIO module or peripheral may control groups of pins which can vary based on the interface requirement. GPIO pins are commonly included in microprocessor and microcontroller applications because they offer flexibility and programmability. For example, an application processor in mobile devices may use a number of GPIO pins to conduct handshake signaling such as inter-processor communication (IPC) with a modem processor.

In many instances, a number of command and control signals are employed to connect different component devices in mobile communication devices. These connections consume precious general-purpose input/output (GPIO) pins within the mobile communication devices and it would be desirable to replace the physical interconnects with signals carried in information transmitted over existing serial data links. However, the serial data links are associated with latencies that can prevent conversion of physical command and control signals to virtual signals, particularly in real-time embedded system applications supported by mobile communication devices that define firm transmission deadlines.

As mobile communication devices continue to include a greater level of functionality, improved serial communication techniques are needed to support low-latency transmissions between peripherals and application processors.

SUMMARY

Certain aspects of the disclosure relate to systems, apparatus, methods and techniques that can facilitate communicating virtual GPIO information generated at multiple source devices and directed to multiple destination devices.

In various aspects of the disclosure, a method for facilitating communication of virtual general-purpose input/output (VGI) over a serial bus is performed at a device coupled to a serial bus and includes determining that an in-band interrupt has been asserted on the serial bus while the serial bus is idle, participating in an exchange of VGI state when a first bit of a device address transmitted during bus arbitration associated with the in-band interrupt has a first value, receiving a plurality of bits of VGI state during the exchange of VGI state, including bits transmitted by a plurality of devices coupled to the serial bus, and mapping at least one bit in the plurality of bits of VGI state to a physical GPIO pin. Transmission of at least a second bit of the device address is suppressed when the first bit of a device address has the first value.

In one aspect the method includes transmitting one or more bits of VGI state during the exchange of VGI state.

In one aspect, mapping the at least one bit in the plurality of bits of VGI state to the physical GPIO pin includes defining voltage state of the physical GPIO pin based on value of the at least one bit.

In certain aspects, a first device in the plurality of devices is configured to transmit VGI state information in a slot that has a slot size defined in terms of a first number of clock pulses in a clock signal transmitted over the serial bus. The first device may be configured with a location of the slot with respect to the first bit of the device address defined in terms of a second number of clock pulses in the clock signal. A first bit of the VGI state information may indicate whether the slot includes valid bits of VGI state. The method may further include refraining from transmitting all of the first number of clock pulses in the slot when the first bit of the VGI state information indicates that the slot includes no valid bits of VGI state.

In some aspects, the method includes configuring one or more line drivers coupling a master device to the serial bus for a push-pull mode of operation after the first bit of the device address has been transmitted. The first bit of the device address may be transmitted by a slave device while the one or more line drivers are in an open-drain mode of operation. The method may include transmitting a first clock signal having a first frequency on the serial bus while the first bit of the device address is being transmitted by the slave device, and transmitting a second clock signal having a second frequency on the serial bus after the first bit of the device address has been transmitted. The second frequency may be greater than the first frequency. The second clock signal may provide a number of clock pulses defining a duration of the exchange of VGI state.

In various aspects of the disclosure, an apparatus has a plurality of GPIO pins, an interface adapted to couple the apparatus to a serial bus, and a processing circuit configured. The processing circuit may be configured to determine that an in-band interrupt has been asserted on the serial bus while the serial bus is idle, participate in an exchange of VGI state when a first bit of a device address transmitted during bus arbitration associated with the in-band interrupt has a first value, receive a plurality of bits of VGI state during the exchange of VGI state, including bits transmitted by a plurality of devices coupled to the serial bus, and map at least one bit in the plurality of bits of VGI state to a physical GPIO pin. Transmission of at least a second bit of the device address is suppressed when the first bit of a device address has the first value.

In various aspects of the disclosure, a processor-readable storage medium maintains data and/or processor readable instructions that, when executed by one or more processors, cause the one or more processors to determine that an in-band interrupt has been asserted on a serial bus while the serial bus is idle participate in an exchange of VGI state when a first bit of a device address transmitted during bus arbitration associated with the in-band interrupt has a first value, receive a plurality of bits of VGI state during the exchange of VGI state, including bits transmitted by a plurality of devices coupled to the serial bus, and define voltage state of a physical GPIO pin based on value of at least one bit in the plurality of bits of VGI state. Transmission of at least a second bit of the device address may be suppressed when the first bit of a device address has the first value.

In various aspects of the disclosure, an apparatus includes means for determining that an in-band interrupt has been asserted on a serial bus while the serial bus is idle, where the apparatus is configured to participate in an exchange of VGI state when a first bit of a device address transmitted during bus arbitration associated with the in-band interrupt has a first value, means for receiving a plurality of bits of VGI state during the exchange of VGI state, including bits transmitted by a plurality of devices coupled to the serial bus, and means for defining voltage state of a physical GPIO pin based on value of at least one bit in the plurality of bits of VGI state. Transmission of at least a second bit of the device address may be suppressed when the first bit of a device address has the first value.

DETAILED DESCRIPTION

Figure 1:
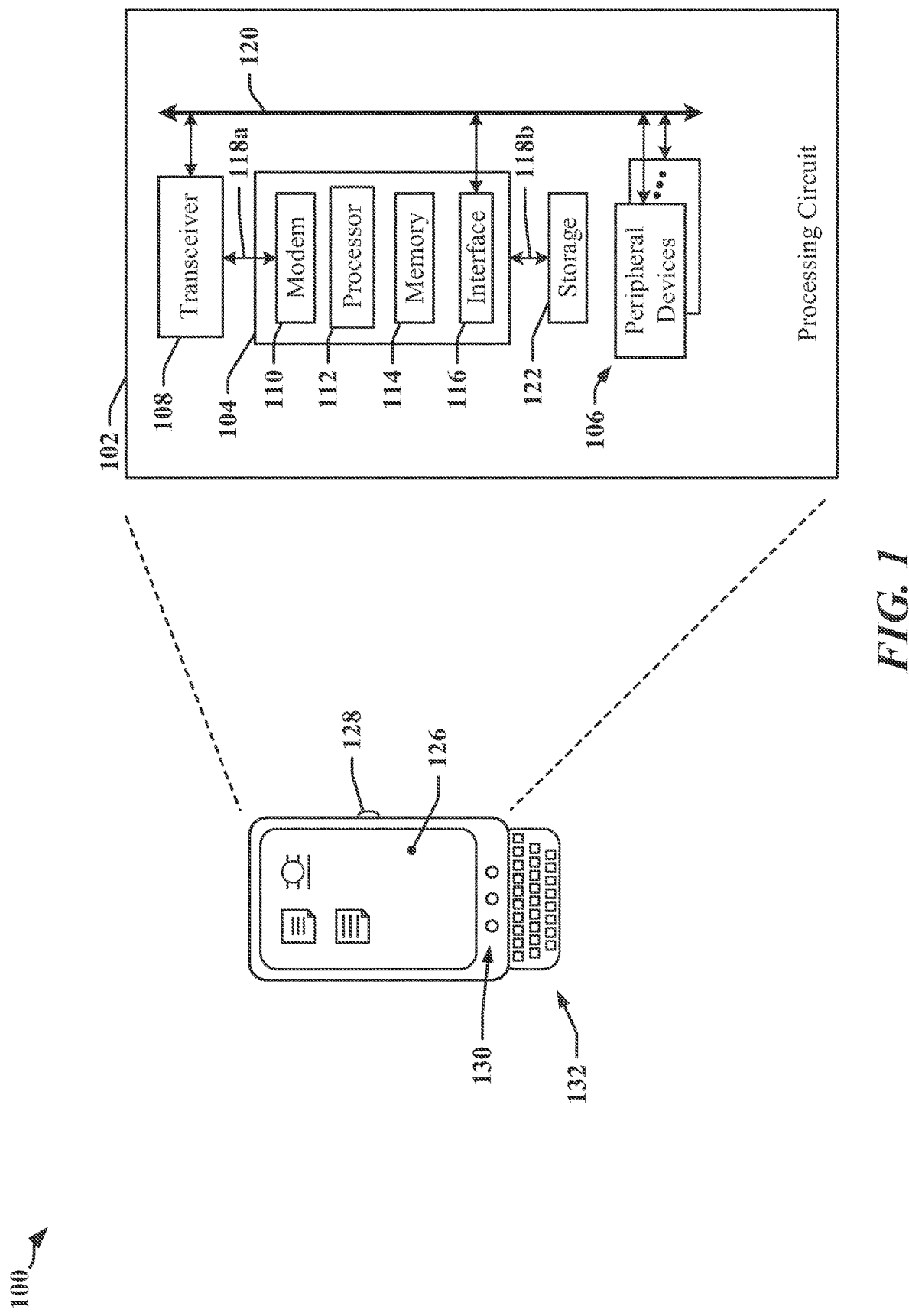
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. In one example, a serial bus may be operated in accordance with an I2C and/or I3C protocol. According to certain aspects disclosed herein, GPIO pins and signals may be virtualized into GPIO state information that may be transmitted over a data communication link. In resulting reduced input/output (RIO) implementations, virtual GPIO state information may be transmitted over a variety of communication links, including links that include wired and radio communication links. For example, virtual GPIO state information can be packetized or otherwise formatted for transmission over a radio access network, such as a Bluetooth, WLAN, cellular and/or other network. Examples involving wired communication links are described herein to facilitate understanding of certain aspects.

Certain aspects disclosed herein provide adaptations of I3C protocols that enable VGI state to be communicated with low latency over a common, multidrop serial bus. Existing protocols have well-defined and immutable structures in the sense that their structures cannot be changed to optimize transmission latencies based on variations in use cases, and/or coexistence with other protocols, devices and applications. It is an imperative of real-time embedded systems that certain deadlines must be met. In certain real-time applications, meeting transmission deadlines is of paramount importance.

Certain aspects disclosed herein relate to communication links, including implementations in which data is serialized and transmitted in accordance with an I3C protocol. Data may be communicated in bits, bytes, characters and/or symbols that can be transmitted in signals transmitted over one or more wires. Certain aspects relate to an exchange of VGI state while an in-band interrupt is being serviced.

In a serial interface, data may be serialized to obtain a sequential series of bits in a payload that can be transmitted with link management data that may identify, source, destination and/or nature of the data carried in the payload. Payload data transmitted in a signal over one or more wires of a serial link may be carried in groupings, including frames and/or transactions defined by a protocol. The protocol may prepend additional data to the payload including, for example, header data (e.g. Start bit or Start sequence), bus management data (e.g. identifiers for in-band-interrupts, bus handover, etc. The payload data may be referred to "application data" transmitted from a sender device to receiver device. For example, the payload data may include data generated by a sensor, controller, application, or other component and the payload data may be directed to a different sensor, controller, application, or other component. The payload data may be followed by error protection data including parity or cyclic redundancy check bits, and terminating and/or footer data including Stop bits or a stop sequence. Management data may be referred to herein as control and command information transmitted to effect management of the bus. Management data may relate to functions such as bus arbitration, in-band-interrupts, as well as commands and signaling used to control modes of operation of the bus, selection of protocols, etc.

In the example of an I3C bus, management data includes Common Command Codes (CCCs) and bits, bytes or words identifying certain bus management functions. A transaction may include management and/or payload data bookended by a preceding Start bit and a terminating Stop bit. A transaction can include multiple frames, where a frame may be a sub-portion of the transaction. For example, payload data may be divided and carried over several frames. In some examples, a frame may include a packet or protocol unit that includes payload data encapsulated in protocol-specific management data, where a transmitting application encapsulates the payload data in management data and a receiving application strips the management data to obtain the payload data.

Certain aspects disclosed herein provide methods, circuits, and systems that are adapted to facilitate communicating virtual GPIO information during in-band interrupt servicing, and virtual GPIO state generated at multiple source devices and directed to multiple destination devices may be exchanged. Each source device may be allocated one or more slots for transmitting virtual GPIO state information. Receivers of virtual GPIO state information capture relevant virtual GPIO state information in the appropriate slots.

In one example, a method for facilitating communication of VGI over a serial bus includes determining that an in-band interrupt has been asserted on the serial bus while the serial bus is idle, participating in an exchange of VGI state when a first bit of a device address transmitted during bus arbitration associated with the in-band interrupt has a first value, receiving a plurality of bits of VGI state during the exchange of VGI state, including bits transmitted by a plurality of devices coupled to the serial bus, and mapping at least one bit in the plurality of bits of VGI state to a physical GPIO pin. Transmission of at least a second bit of the device address is suppressed when the first bit of a device address has the first value. The serial bus may be operated in accordance with an I3C protocol.

Examples of Apparatus that Employ Serial Communication Links

According to certain aspects, a serial communication link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a serial communication bus. The apparatus 100 may include a processing circuit 102 having multiple circuits or devices 104, 106, and/or 108, which may be implemented in one or more application-specific integrated circuits (ASICs) or in an SoC. In one example, the apparatus 100 may be a communication device and the processing circuit 102 may include a processing device provided in an ASIC 104, one or more peripheral devices 106, and a transceiver 108 that enables the apparatus to communicate with a radio access network, a core access network, the Internet, and/or another network.

The ASIC 104 may have one or more processors 112, one or more modems 110, on-board memory 114, a bus interface circuit 116, and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as a display 126, operator controls, such as switches or buttons 128, 130, and/or an integrated or external keypad 132, among other components. A user interface module may be configured to operate with the display 126, external keypad 132, and other such devices through a dedicated communication link or through one or more serial buses.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic, and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
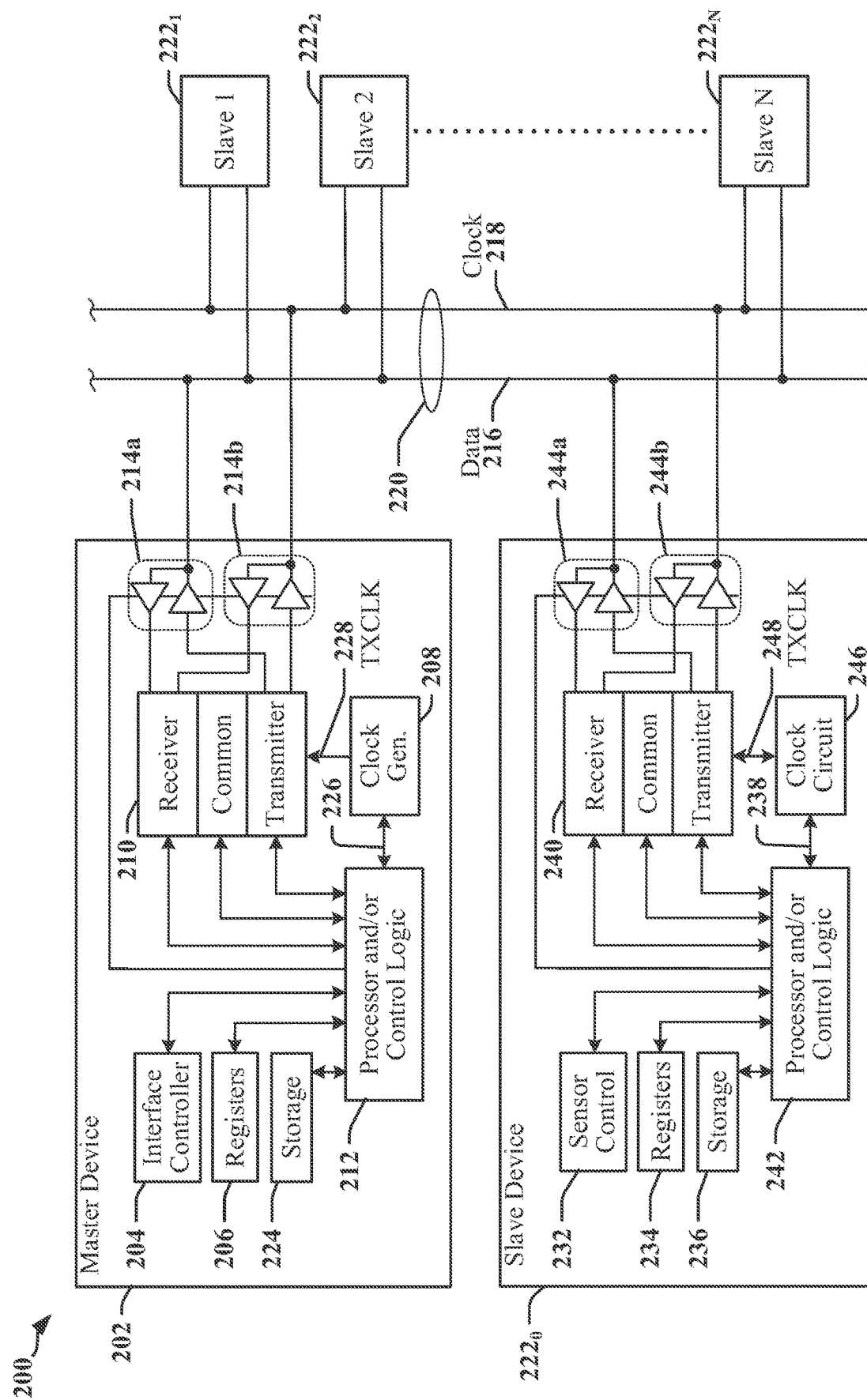
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an application processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222o$-$222_N$ may be used to control, manage or monitor a sensor device. Communications between devices 202 and $222_0$-$222_N$ over the serial bus 220 is controlled by a bus master 202. Certain types of bus can support multiple bus masters 202.

In one example, a master device 202 may include an interface controller 204 that may manage access to the serial bus, configure dynamic addresses for slave devices $222_0$-$222_N$ and/or generate a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222o$ configured to operate as a slave device may provide a control function, module or circuit 232 that includes circuits and modules to support a display, an image sensor, and/or circuits and modules that control and communicate with one or more sensors that measure environmental conditions. The slave device $222o$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 228 may be derived from a signal received from the clock line 218. Other timing clocks 238 may be used by the control logic 242 and other functions, circuits or modules.

The serial bus 220 may be operated in accordance with RFFE, I2C, I3C, SPMI, or other protocols. At least one device 202, $222_0$-$222_N$ may be configured to operate as a master device and a slave device on the serial bus 220. Two or more devices 202, $222_0$-$222_N$ may be configured to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

Virtual GPIO

Figure 3:
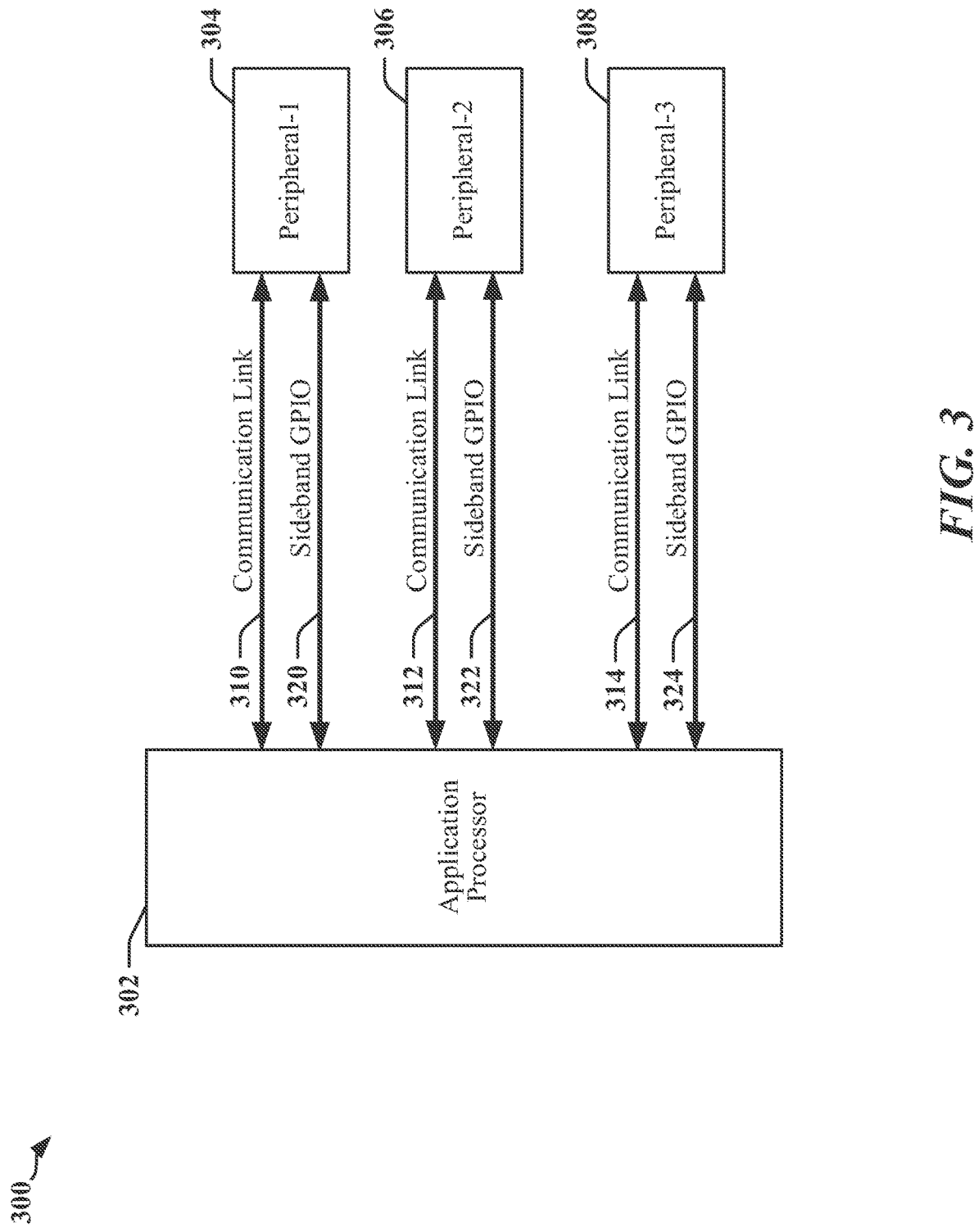
FIG. 3 illustrates an apparatus that includes an application processor and multiple peripheral devices that may be adapted according to certain aspects disclosed herein.

Mobile communication devices, and other devices that are related or connected to mobile communication devices, increasingly provide greater capabilities, performance and functionalities. In many instances, a mobile communication device incorporates multiple IC devices that are connected using a variety of communications links. FIG. 3 illustrates an apparatus 300 that includes an Application Processor 302 and multiple peripheral devices 304, 306, 308. In the example, each peripheral device 304, 306, 308 communicates with the Application Processor 302 over a respective communication link 310, 312, 314 operated in accordance with mutually different protocols. Communication between the Application Processor 302 and each peripheral device 304, 306, 308 may involve additional wires that carry control or command signals between the Application Processor 302 and the peripheral devices 304, 306, 308. These additional wires may be referred to as sideband general purpose input/output (sideband GPIO 320, 322, 324), and in some instances the number of connections needed for sideband GPIO 320, 322, 324 can exceed the number of connections used for a communication link 310, 312, 314.

GPIO provides generic pins/connections that may be customized for particular applications. For example, a GPIO pin may be programmable to function as an output, input pin or a bidirectional pin, in accordance with application needs. In one example, the Application Processor 302 may assign and/or configure a number of GPIO pins to conduct handshake signaling or inter-processor communication (IPC) with a peripheral device 304, 306, 308 such as a modem. When handshake signaling is used, sideband signaling may be symmetric, where signaling is transmitted and received by the Application Processor 302 and a peripheral device 304, 306, 308. With increased device complexity, the increased number of GPIO pins used for IPC communication may significantly increase manufacturing cost and limit GPIO availability for other system-level peripheral interfaces.

According to certain aspects, the state of GPIO, including GPIO associated with a communication link, may be captured, packetized, serialized and transmitted over a communication link. In one example, captured GPIO may be transmitted over an I3C bus using common command codes to indicate that an I3C transaction includes packetized GPIO information and/or a destination for GPIO information.

Figure 4:
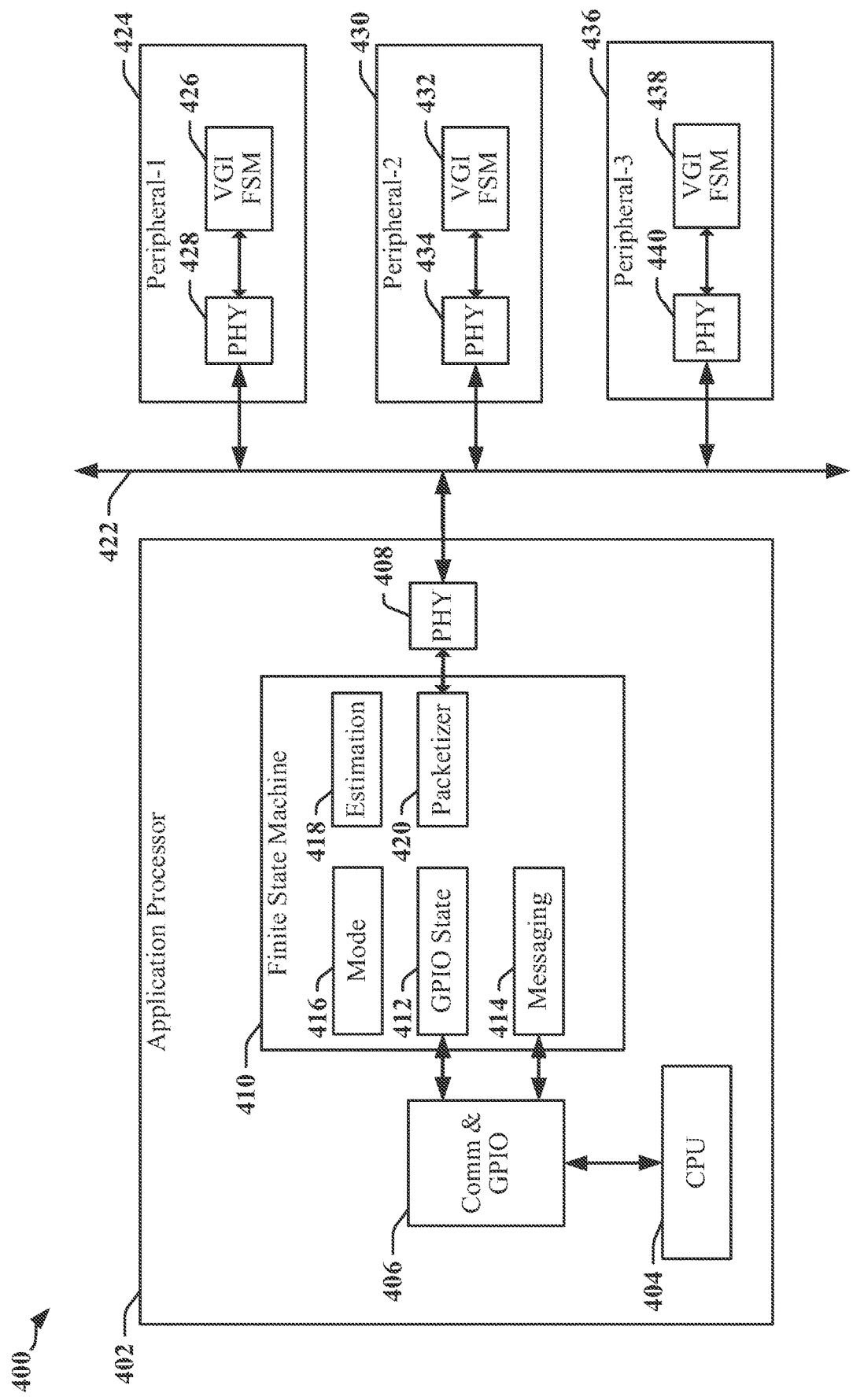
FIG. 4 illustrates an apparatus that has been adapted to support VGI in accordance with certain aspects disclosed herein.

FIG. 4 illustrates an apparatus 400 that is adapted to support Virtual GPIO (VGI or VGMI) in accordance with certain aspects disclosed herein. VGI circuits and techniques can reduce the number of physical pins and connections used to connect an Application Processor 402 with one or more peripheral devices 424, 430, 436. A finite state machine (VGI FSM 410) may be configured to manage and/or implement virtualization of GPIO state for transmission in virtual GPIO messages over a communication link 422. In one example, virtual GPIO messages may be transmitted in packets over a communication link 422 that includes a multi-wire bus, such as a serial bus. When the communication link 422 is provided as a serial bus, the receiving peripheral device 424, 430, 436 may deserialize received packets and may extract virtual GPIO messages in packets received from the Application Processor 402. A finite state machine (VGI FSM 426, 432, 438) in the peripheral device 424, 430, 436 may convert the virtual GPIO messages to physical GPIO state of internal GPIO pins.

In another example, the communication link 422 may be a provided by a radio frequency transceiver that supports communication using, for example, a Bluetooth protocol, a WLAN protocol, a cellular wide area network, and/or another communication protocol. Virtual GPIO state may be transmitted in packets, frames, subframes, transactions, or other data structures over the communication link 422, and the receiving peripheral device 424, 430, 436 may extract, deserialize and otherwise process received signaling to obtain the virtual GPIO state. Upon receipt of virtual GPIO messages, the VGI FSM 426, 432, 438 or another component of the receiving device may interrupt its host processor to indicate receipt of the messages and/or any changes in physical GPIO state.

In an example in which the communication link 422 is implemented as a serial bus, virtual GPIO messages may be transmitted as payload data in transactions configured for an I2C, I3C, or another standardized serial interface. In the illustrated example, VGI techniques may be employed to accommodate I/O bridging between an Application Processor 402 and one or more peripheral devices 424, 430, 436. The Application Processor 402 may be provided in an ASIC, SoC, or another type of IC device. The Application Processor 402 includes a processor (central processing unit or CPU 404) that generates events and virtual GPIO messages associated with one or more communication channels 406. Virtual GPIO messages produced by the communication channels 406 may be monitored by respective monitoring circuits 412, 414 in a VGI FSM 426, 432, 438. In some examples, a GPIO monitoring circuit 412 may be adapted to produce virtual GPIO messages representative of the state of physical GPIO state and/or changes in the physical GPIO state. In some examples, other circuits are provided to produce the virtual GPIO messages representative of the physical GPIO state and/or changes in physical GPIO state.

An estimation circuit 418 may be configured to estimate latency information for the virtual GPIO messages, and may select a protocol, and/or a mode of communication for the communication link 422 that optimizes the latency for encoding and transmitting the virtual GPIO messages. The estimation circuit 418 may maintain protocol and mode information 416 that characterizes certain aspects of the communication link 422 to be considered when selecting the protocol, and/or a mode of communication. The estimation circuit 418 may be further configured to select a packet type for encoding and transmitting the virtual GPIO messages. The estimation circuit 418 may provide configuration information used by a packetizer 420 to encode physical GPIO state. In one example, the configuration information is provided as a command that may be encapsulated in a packet such that the type of packet can be determined at a receiver. The configuration information, which may be a command, may also be provided to physical layer circuits (PHY 408). The PHY 408 may use the configuration information to select a protocol and/or mode of communication for transmitting the associated packet. The PHY 408 may then generate the appropriate signaling to transmit the packet.

The peripheral device 424, 430, 436 may include a VGI FSM 426, 432, 438 that is configured to process data packets received from the communication link 422. The VGI FSM 426, 432, 438 at the peripheral device 424, 430, 436 may extract messages and may map bit positions in virtual GPIO messages onto physical GPIO pins in the peripheral device 424, 430, 436. In certain embodiments, the communication link 422 is bidirectional, and both the Application Processor 402 and a peripheral device 424, 430, 436 may operate as both transmitter and receiver.

The PHY 408 in the Application Processor 402 and a corresponding PHY 428, 434, 440 in the peripheral device 424, 430, 436 may be configured to establish and operate the communication link 422. Each PHY 408, 428, 434, 440 may be coupled to, or include a transceiver 108 (see FIG. 1). In some examples, the PHY 408, 428, 434, 440 may support a two-wire interface such as an I2C and/or I3C interface at the Application Processor 402 and peripheral device 424, 430, 436, respectively, and virtual GPIO messages may be encapsulated into a packet transmitted over the communication link 422.

VGI tunneling, as described herein, can be implemented using existing or available protocols configured for operating the communication link 422, and without the full complement of physical GPIO pins. VGI FSMs 410, 426, 432, 438 may virtualize GPIO state without intervention of a processor in the Application Processor 402 and/or a processor in the peripheral device 424, 430, 436. The use of VGI can reduce pin count, power consumption, and latency associated with the communication link 422.

At a receiving device, virtual GPIO messages are decoded to produce physical GPIO state. Certain characteristics of the physical GPIO pins may be configured using the virtual GPIO messages. For example, slew rate, polarity, drive strength, and other related parameters and attributes of the physical GPIO pins may be configured using the virtual GPIO messages. Configuration parameters used to configure the physical GPIO pins may be stored in configuration registers associated with corresponding GPIO pins. These configuration parameters can be addressed using a proprietary or conventional protocol such as I2C and/or I3C protocols. In one example, configuration parameters may be maintained in I3C addressable registers. Certain aspects disclosed herein relate to reducing latencies associated with the transmission of configuration parameters and corresponding addresses (e.g., addresses of registers used to store configuration parameters).

The VGI interface enables transmission of virtual GPIO messages, whereby virtual GPIO messages, application messages, or both can be sent as a serial data stream over a communication link 422. In one example, a serial data stream may be packetized for transmission over an I2C and/or I3C bus in a transaction, which may include a sequence of frames. The presence of virtual GPIO data in an I2C/I3C frame may be signaled using a special command code to identify the frame as a virtual GPIO frame. Virtual GPIO frames may be transmitted as broadcast frames or addressed frames in accordance with an I2C or I3C protocol. The VGI interface may also be referred to as a VGI messaging interface or VGMI.

Virtual GPIO Over I3C

Certain aspects disclosed herein related to the use of an I3C serial bus for exchanging VGI messages between two or more devices. A VGI over I3C may be implemented as a logical layer that manages the exchange of GPIO state information. VGI over I3C may enable VGI message exchanges to take advantage of I3C features including variable length messaging and flow control in a multi-slave device environment.

Figure 5:
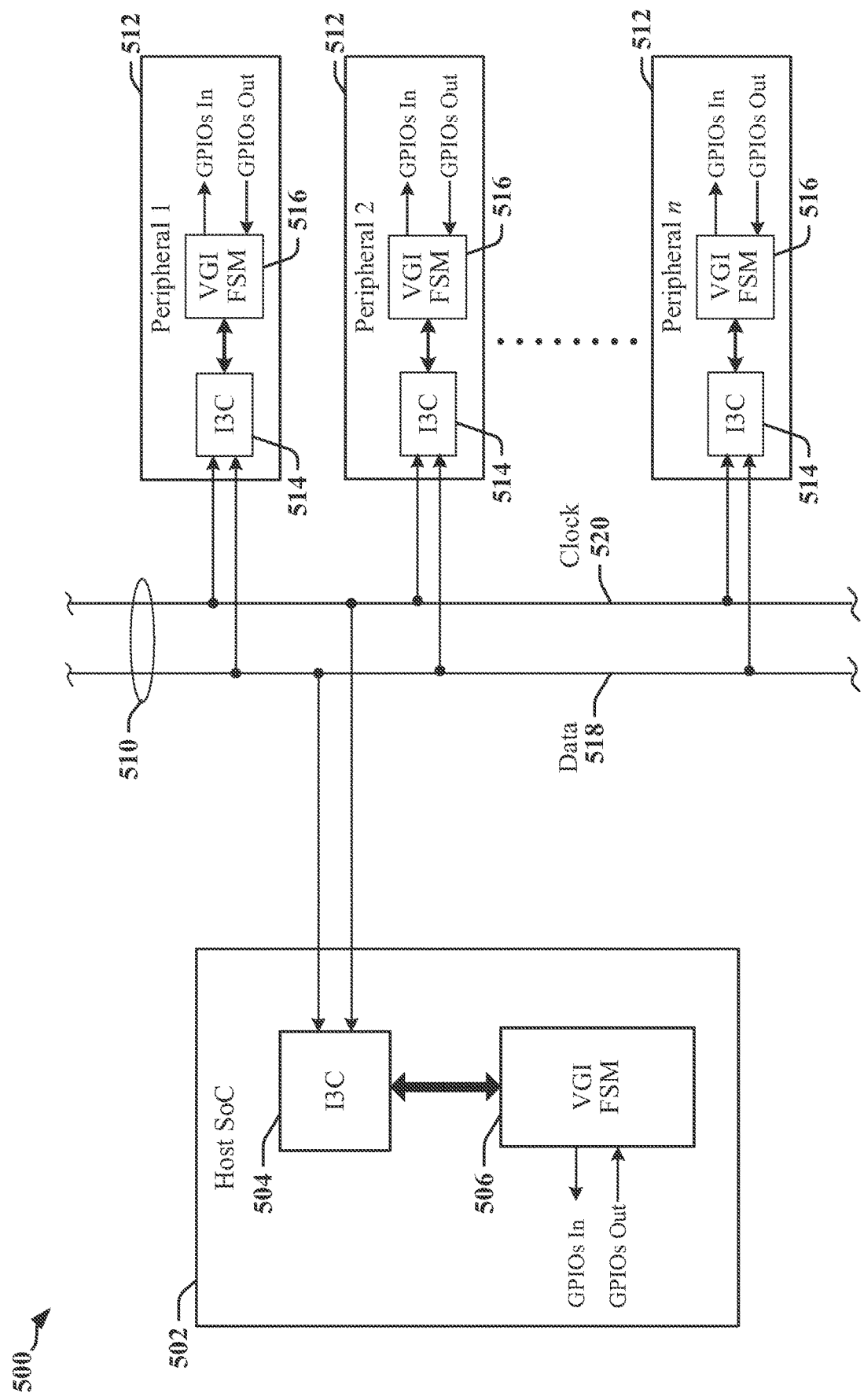
FIG. 5 illustrates a device that employs an I3C bus to couple various devices in accordance with certain aspects disclosed herein.

FIG. 5 illustrates an example of an apparatus 500 that uses an I3C bus that couples multiple devices 502, 512 and that can carry VGI messages between two or more devices 502, 512. The apparatus may include a host SoC 502 and a number of peripheral devices 512. The host SoC 502 may include a virtual GPIO finite state machine (VGI FSM 506) and an I3C interface 504, where the I3C interface 504 cooperates with corresponding I3C interfaces 514 in the peripheral devices 512 to provide a communication link between the host SoC 502 and the peripheral devices 512. Each peripheral device 512 includes a VGI FSM 516. In the illustrated example, communications between the SoC 502 and a peripheral device 512 may be serialized and transmitted over a multi-wire serial bus 510 in accordance with an I3C protocol. In other examples, the host SoC 502 may include other types of interface, including I2C and/or RFFE interfaces. In other examples, the host SoC 502 may include a configurable interface that may be employed to communicate using I2C, I3C, RFFE and/or another suitable protocol. In some examples, a multi-wire serial bus 510, such as an I2C or I3C bus, may transmit a data signal over a data wire 518 and a clock signal over a clock wire 520.

Virtual GPIO may be transmitted in high-priority, low-latency messages. Bus latency may include the time required to terminate a transaction in process on the serial bus, bus turnaround (between transmit mode and receive mode), bus arbitration and/or command transmissions specified by protocol. Bus latency can affect the ability of a serial bus to handle high-priority, real-time and/or other time-constrained messages. Low-latency messages, or messages requiring low bus latency, may carry information related to sensor status, device-generated real-time events and virtualized GPIO. In one example, bus latency may be measured as the time elapsed between a message becoming available for transmission and the delivery of the message or, in some instances, commencement of transmission of the message. Other measures of bus latency may be employed or available to a system designer. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

Figure 6:
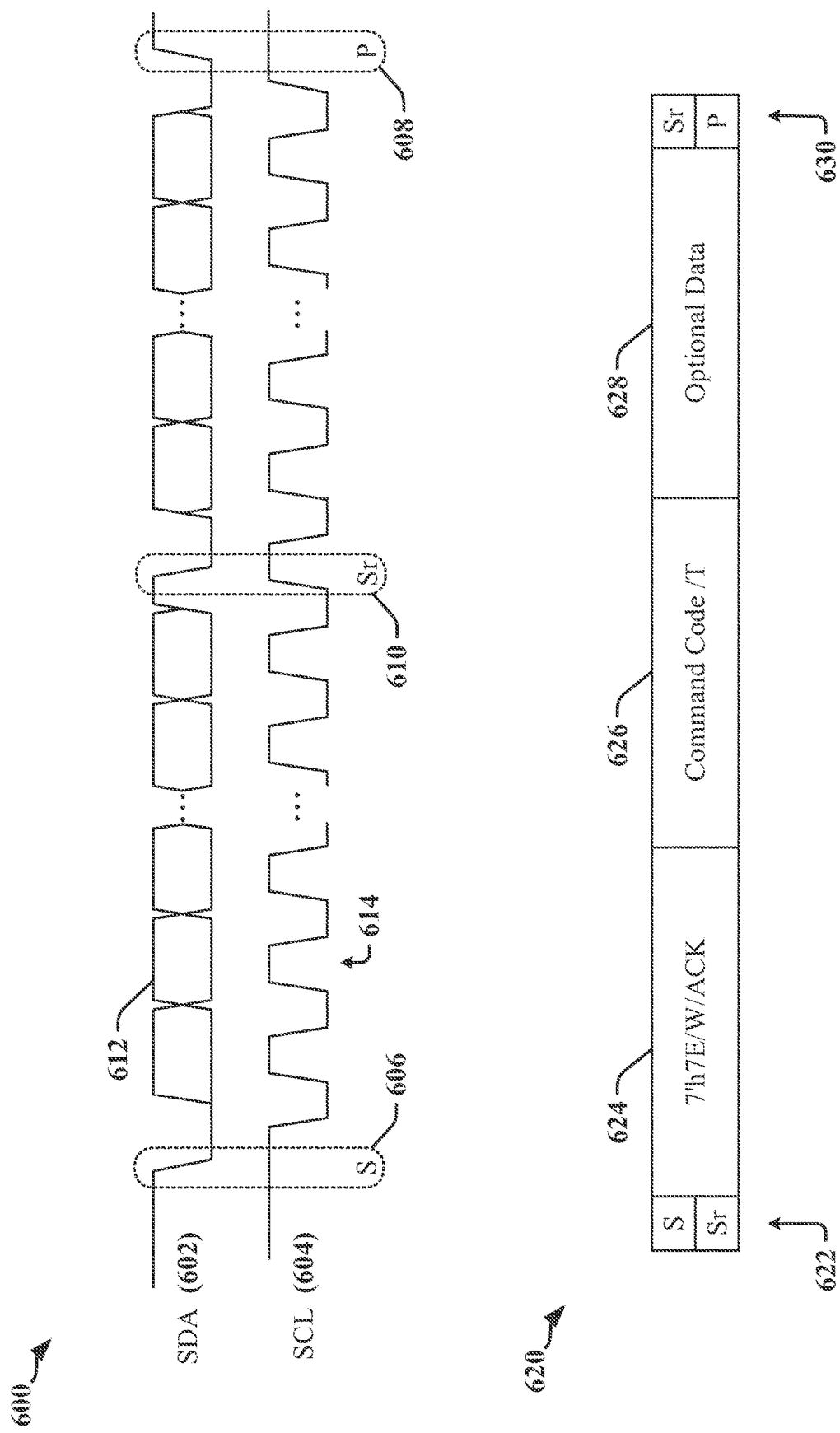
FIG. 6 includes a timing diagram that illustrates signaling on a serial bus when the serial bus is operated in a single data rate (SDR) mode of operation defined by I3C specifications.

FIG. 6 includes a timing diagram 600 that illustrates signaling on a serial bus when the serial bus is operated in a single data rate (SDR) mode of operation defined by I3C specifications. Data transmitted on a first wire (the data wire or SDA 602) of the serial bus may be captured using a clock signal transmitted on a second wire (the clock wire or SCL 604) of the serial bus. During data transmission, the signaling state 612 of SDA 602 is expected to remain constant for the duration of the pulses 614 when SCL 604 is at a high voltage level. Transitions on SDA 602 when SCL 604 is at the high voltage level indicate a START condition 606, a STOP condition 608 or a repeated START 610.

On an I3C serial bus, a START condition 606 is defined to permit the current bus master to signal that data is to be transmitted. The START condition 606 occurs when SDA 602 transitions from high to low while SCL 604 is high. The bus master may signal completion and/or termination of a transmission using a STOP condition 608. The STOP condition 608 is indicated when SDA 602 transitions from low to high while SCL 604 is high. A repeated START 610 may be transmitted by a bus master that wishes to initiate a second transmission upon completion of a first transmission. The repeated START 610 is transmitted instead of a STOP condition 608, and has the significance of a STOP condition 608 followed immediately by a START condition 606. The repeated START 610 occurs when SDA 602 transitions from high to low while SCL 604 is high.

The bus master may transmit an initiator 622 that may be a START condition 606 or a repeated START 610 prior to transmitting an address of a slave, a command, and/or data. FIG. 6 illustrates a command code transmission 620 by the bus master. The initiator 622 may be followed in transmission by a predefined command 624 indicating that a command code 626 is to follow. The command code 626 may, for example, cause the serial bus to transition to a desired mode of operation. In some instances, data 628 may be transmitted. The command code transmission 620 may be followed by a terminator 630 that may be a STOP condition 608 or a repeated START 610.

I3C specifications define in-band interrupt, discovery, enumeration and dynamic address allocation procedures, which are typically performed in SDR the mode of operation. For example, one or more slave devices may drive SDA 602 low to initiate an in-band interrupt while the serial bus is idle. The serial bus is idle after a STOP condition 608 has been transmitted and before a START condition 606 is transmitted. The master device may place its line drivers in open-drain mode when while the serial bus is idle, and both SDA 602 and SCL 604 are pulled up to a high voltage level when the serial bus is idle using a pull-up resistor or the like. Any device that has a high-priority message or pending request for service may assert an in-band interrupt request.

Line drivers must overcome the pull-up resistor in open-drain mode, and transitions are relatively slow and bus clock rates may be limited. In one example, I2C-compatible, open-drain modes of communication support clock rates of 400 kHz or 1 MHz. In I3C modes of operation, line drivers can be operated in push-pull mode and clock rates may be an order of magnitude larger than clock rates achievable in open-drain mode.

A bus master may respond to an in-band interrupt by initiating a bus arbitration procedure in open-drain mode. The bus arbitration procedure includes an enumeration phase to identify slave devices that have asserted or are requesting an in-band interrupt. The enumeration phase uses the open-drain mode to permit slave devices to drive SDA 602 in order to identify the highest priority device requesting service. The highest priority device has the lowest slave address. Each slave device transmits its slave address on SDA 602, commencing with the most significant bit (A[6]), and may continue transmitting address bits until another slave device overrides the transmitted bit. An address bit that is set to logic '0' causes a line driver in a slave to actively pull SDA 602 low, whereas an address bit that is set to logic '1' is transmitted when the pull-up resistor pulls SDA 602 high. Accordingly, a lower value bit overrides a higher value bit. The highest priority device has the lowest address and can successfully transmit its slave address.

The slow bus clock rate associated with open-drain mode results in an arbitration that can consume long periods of time. Minimum latencies greater than 10 microseconds may result when multiple slave devices can concurrently request in-band interrupt service. The high latency associated with in-band interrupt processing may render the I3C bus unsuitable for transporting VGI messages with low latency requirements. The high latency associated with in-band interrupt processing may prevent the exchange of state information in real time. The sequential nature of in-band interrupt servicing may preclude the provision of a common view of GPIO state across multiple devices.

Certain aspects disclosed herein relate to an optimized arbitration procedure that uses a single clock period in open-drain mode and that provides time slots for the transmission of VGI state from multiple devices during a single transaction. In one example, VGI state may be transferred using a time division multiplexing scheme whereby each slave device is allocated a number of push-pull clock periods after the single open-drain clock period has expired. Bus latency can be substantially reduced by implementing some combination of the optimized, shortened arbitration procedure and the multiplexing scheme to transmit VGI state information from multiple sources during a single in-band interrupt, as disclosed herein.

Figure 7:
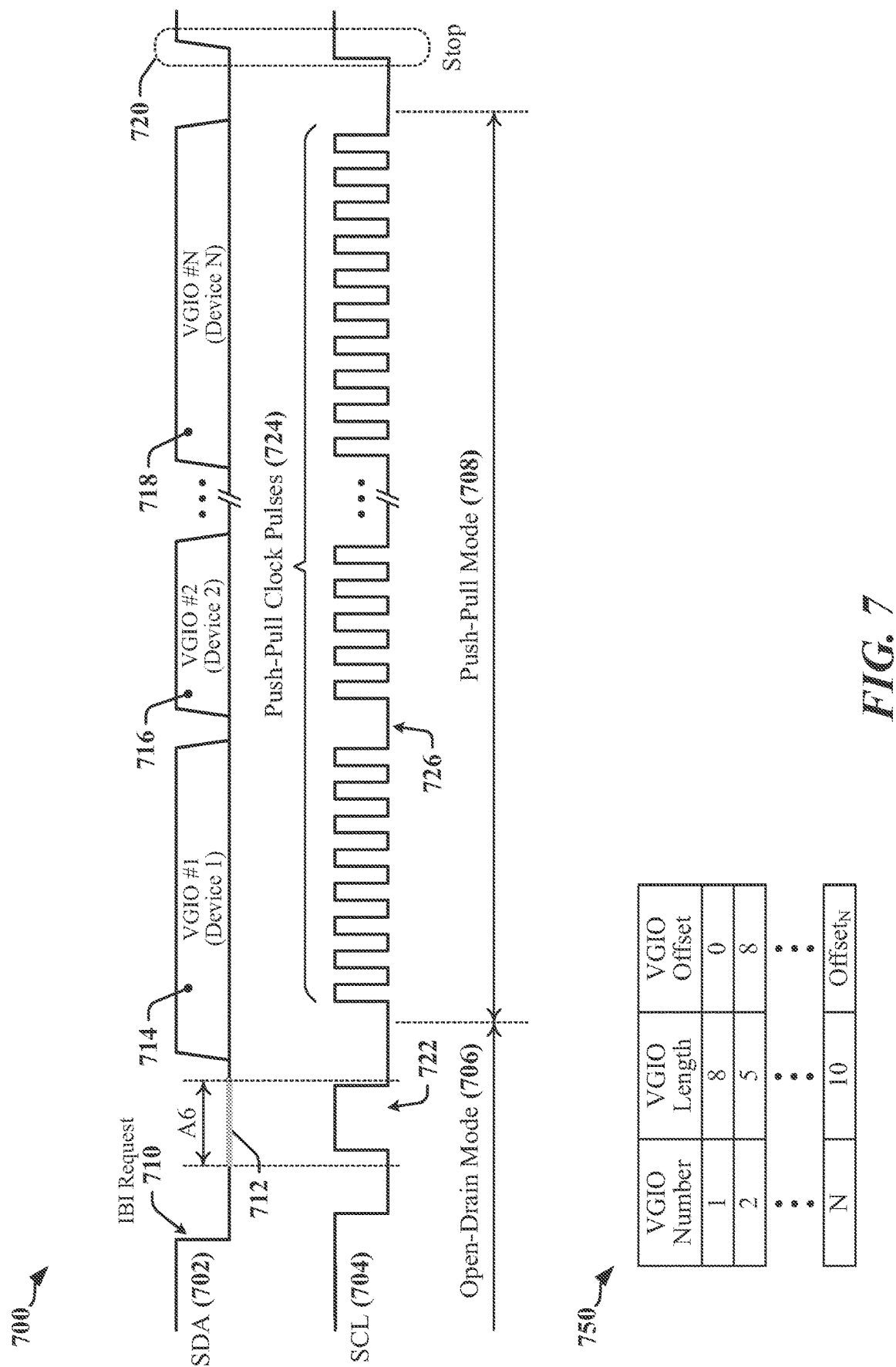
FIG. 7 illustrates a first example of a VGI state exchange in accordance with certain aspects disclosed herein.

FIG. 7 illustrates a first example of a VGI state exchange 700 in accordance with certain aspects disclosed herein. Devices coupled to the serial bus may be configured to recognize a high-priority in-band interrupt request when logic '0' is the first-transmitted device address bit 712 (A[6]). The arbitration process may be terminated immediately when the high-priority in-band interrupt is recognized, and the exchange of VGI state may commence.

In one example, an in-band interrupt request 710 is asserted when SDA 702 is driven low while the serial bus is idle and operated in an open-drain mode 706. The master device responds to the request by transmitting a clock pulse 722 on SCL 704. One or more slave devices may drive SDA 702 in accordance with the most significant bit of their respective slave addresses. When at least one slave device drives SDA 702 low as the first-transmitted device address bit 712, the master device terminates the arbitration process and enters a push-pull mode period 708. The frequency of the clock signal on SCL 704 is increased in the push-pull mode period 708. Early termination of the open-drain mode and increased clock frequency can significantly reduce latency for exchange of VGI state.

Each slave device is assigned a time slot 714, 716, 718 during which bits of VGI state may be transmitted. Assignment of time slots 714, 716, 718 may be defined dynamically, during system initialization or configuration, device initialization, and/or at the time of manufacture or assembly. The duration of each time slot 714, 716, 718 may be defined in terms of a number or proportion of the clock pulses 724 transmitted during the push-pull mode period 708. The clock pulses transmitted in a time slot 714, 716, 718 may be used to time transmission of bits of VGI state by a corresponding slave device. The duration of each time slot 714, 716, 718 may be defined independently of one another. In the example, a first time slot 714 includes 8 clock pulses, a second time slot 716 includes 5 clock pulses, and a third time slot 718 includes 10 clock pulses.

In some implementations, a master device may stretch the clock signal between one or more time slots 714, 716, 718 to support bus turnaround. In one example, a slave device that is transmitting in a first time slot 714, 716, 718 reconfigures its bus interface to receive data transmitted in the next time slot 714, 716, 718. In another example, a slave device that is receiving state information in a first time slot 714, 716, 718 reconfigures its bus interface to transmit data in the next time slot 714, 716, 718. Some slave devices may need additional time between time slots 714, 716, 718 to accomplish bus turnaround. The master device may be configured with information identifying a duration 726 between pulses to enable bus turnaround between time slots 714, 716, 718.

One or more devices may monitor the serial bus and each device may capture any bits of VGI state that is directed or relevant to one or more physical GPIO pins within the device. In one example, VGI state information may be exchanged between pairs of devices. For example, each bit of the state information transmitted in a time slot 714, 716, 718 may be consumed by a single device. In another example, one or more bits of the state information transmitted in a time slot 714, 716, 718 may be consumed by two or more devices. Each device that consumes VGI state information may be configured with information identifying the bits of VGI state information to be captured and mapping of each captured bit of VGI state information to a physical GPIO pin. Bits of VGI state information may be identified by time slot 714, 716, 718 and clock pulse within the time slot 714, 716, 718, by clock pulse number within the total set of clock pulses 724 transmitted during the push-pull mode period 708, using an offset value for example.

FIG. 7 illustrates a table 750 that may be configured at each device coupled to the serial bus. The table 750 the structure of VGI state information transmissions after an in-band interrupt as disclosed herein. Other information maintained by a device coupled to the serial bus may reference the table. For example, a device may identify transmission timing for bits of VGI state information to be captured by the device.

Figure 8:
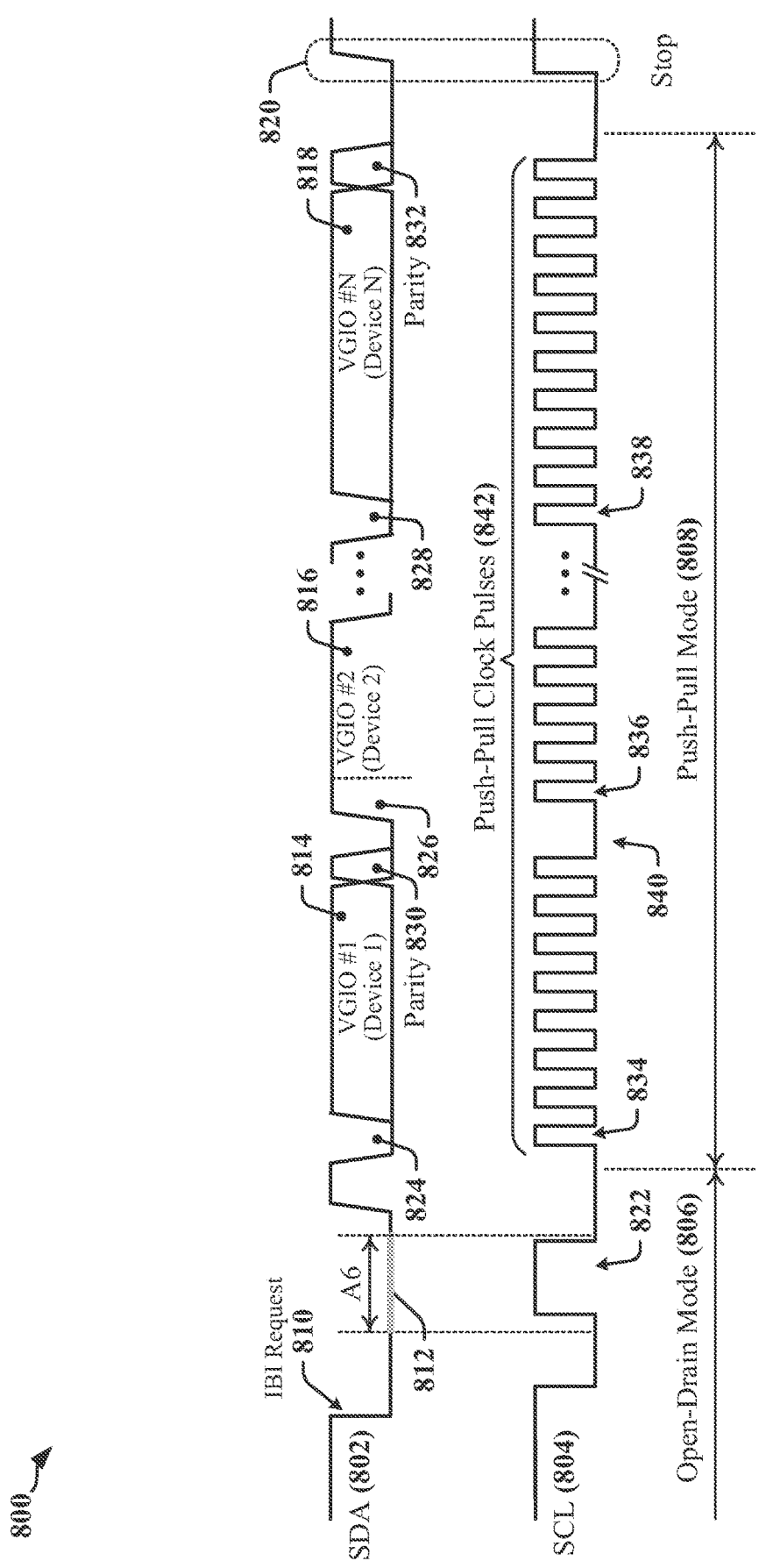
FIG. 8 illustrates a second example of a VGI state exchange in accordance with certain aspects disclosed herein.

FIG. 8 illustrates a second example of a VGI state exchange 800 in accordance with certain aspects disclosed herein. Devices coupled to the serial bus may be configured to recognize a high-priority in-band interrupt request when logic '0' is the first-transmitted device address bit 812 (A[6]). The arbitration process may be terminated immediately when the high-priority in-band interrupt is recognized, and the exchange of VGI state may commence.

In one example, an in-band interrupt request 810 is asserted when SDA 802 is driven low while the serial bus is idle and operated in an open-drain mode 806. The master device responds to the request by transmitting a clock pulse 822 on SCL 804. One or more slave devices may drive SDA 802 in accordance with the most significant bit of their respective slave addresses. When at least one slave device drives SDA 802 low as the first-transmitted device address bit 812, the master device terminates the arbitration process and enters a push-pull mode period 808. The frequency of the clock signal transmitted on SCL 804 is increased in the push-pull mode period 808. Early termination of the open-drain mode and increased clock frequency can significantly reduce latency for exchange of VGI state.

Each slave device is assigned a time slot 814, 816, 818 during which bits of VGI state may be transmitted. Parity 830, 832 may be transmitted in time slots 814, 818 that carry VGI state bits. Assignment of time slots 814, 816, 818 may be defined dynamically, during system initialization or configuration, device initialization, and/or at the time of manufacture or assembly. The duration of each time slot 814, 816, 818 may be defined as a number or proportion of the clock pulses 842 transmitted during the push-pull mode period 808. The clock pulses transmitted in a time slot 814, 816, 818 may be used to time transmission of bits of VGI state by a corresponding slave device. The duration of each time slot 814, 816, 818 may be defined independently of one another.

In the example, a first time slot 814 includes 8 clock pulses, a second time slot 816 includes 5 clock pulses, and a third time slot 818 includes 10 clock pulses.

In some implementations, a slave device may signal whether it intends to transmit VGI state information at the commencement of its assigned time slot 814, 816, 818. In the illustrated example, the first bit interval 824, 826, 828 corresponding to the first clock pulse 834, 836, 838 of the clock pulses transmitted in the time slot 814, 816, 818 indicates whether the device intends to transmit state information. The first bit interval 824, 826, 828 may serve as a presence indicator when intention to transmit VGI state information is provided affirmatively. That is, a slave device that is hibernating, malfunctioning or otherwise inactive does not participate in the VGI state exchange 800 and is not in a state or condition to affirmatively signal intention to transmit VGI state information. Other devices coupled to the serial bus recognize that SDA 802 is not driven during the first bit interval 824, 826, 828 associated with the inactive device and recognize that no VGI state information is to be received during the corresponding time slot 814, 816, 818.

In the illustrated example, SDA 802 is low during the first bit interval 824, 828 of two time slots 814, 818 to indicate that VGI state information is being transmitted during the two time slots 814, 818, while SDA 802 is high during the first bit interval 826 of a third time slot 816 to indicate that no VGI state information is being transmitted during the third time slot 816. SDA 802 may be held high during the first bit interval 826 of the third time slot 816 by a keeper circuit or resistor. A keeper circuit may include a weak driver configured to drive SDA 802 based on a positive feedback representation of the signaling state of SDA 802. The output of the weak driver is easily overcome by a push-pull driver.

In some implementations, a master device may stretch the clock signal between one or more time slots 814, 816, 818 to support bus turnaround. In one example, a slave device that is transmitting in a first time slot 814, 816, 818 reconfigures its bus interface to receive data transmitted in the next time slot 814, 816, 818. In another example, a slave device that is receiving state information in a first time slot 814, 816, 818 reconfigures its bus interface to transmit data in the next time slot 814, 816, 818. Some slave devices may need additional time between time slots 814, 816, 818 to accomplish bus turnaround. The master device may be configured with information identifying a duration 840 between pulses to enable bus turnaround between time slots 814, 816, 818.

One or more devices may monitor the serial bus and each device may capture any bits of VGI state that is directed or relevant to one or more physical GPIO pins within the device. In one example, VGI state information may be exchanged between pairs of devices. For example, each bit of the state information transmitted in a time slot 814, 816, 818 may be consumed by a single device. In another example, one or more bits of the state information transmitted in a time slot 814, 816, 818 may be consumed by two or more devices. Each device that consumes VGI state information may be configured with information identifying the bits of VGI state information to be captured and mapping of each captured bit of VGI state information to a physical GPIO pin. Bits of VGI state information may be identified by time slot 814, 816, 818 and clock pulse within the time slot 814, 816, 818, and/or by clock pulse number within the total set of clock pulses 842 transmitted during the push-pull mode period 808, using an offset value for example.

Figure 9:
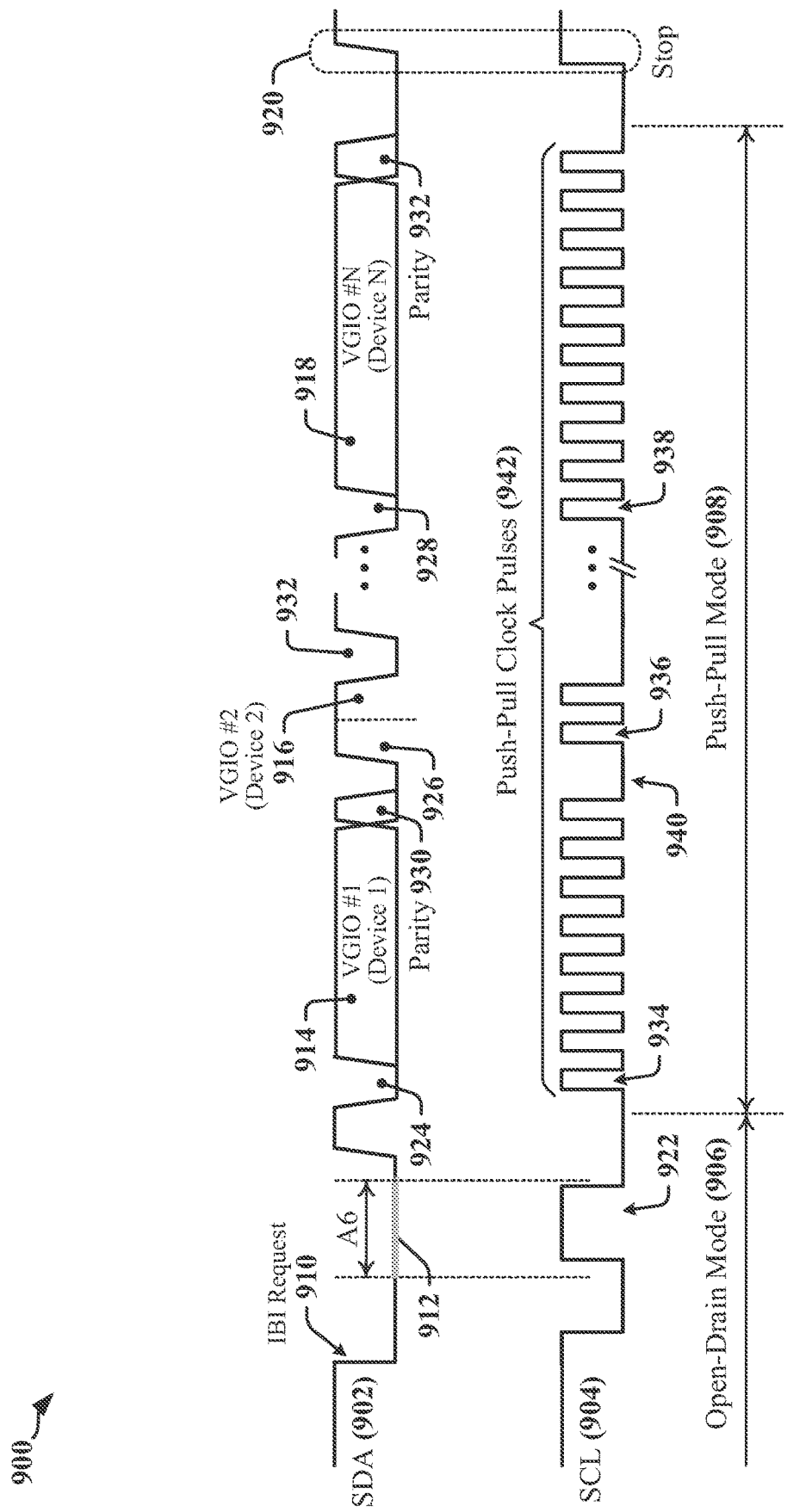
FIG. 9 illustrates a third example of a VGI state exchange in accordance with certain aspects disclosed herein.

Bus latency can be further reduced by selectively truncating one or more of VGI state information transmission time slots based on the state of the presence indicator. FIG. 9 illustrates a third example of a VGI state exchange 900 in accordance with certain aspects disclosed herein. Devices coupled to the serial bus may be configured to recognize a high-priority in-band interrupt request when logic '0' is the first-transmitted device address bit 912 (A[6]). The arbitration process may be terminated immediately when the high-priority in-band interrupt is recognized, and the exchange of VGI state may commence.

In one example, an in-band interrupt request 910 is asserted when SDA 902 is driven low while the serial bus is idle and operated in an open-drain mode 906. The master device responds to the request by transmitting a clock pulse 922 on SCL 904. One or more slave devices may drive SDA 902 in accordance with the most significant bit of their respective slave addresses. When at least one slave device drives SDA 902 low as the first-transmitted device address bit 912, the master device terminates the arbitration process and enters a push-pull mode period 908. The frequency of the clock signal transmitted on SCL 904 is increased in the push-pull mode period 908. Early termination of the open-drain mode and increased clock frequency can significantly reduce latency for exchange of VGI state.

Each slave device is assigned a time slot 914, 916, 918 during which bits of VGI state may be transmitted. Parity 930, 932 may be transmitted in time slots 914, 918 that carry VGI state bits. Assignment of time slots 914, 916, 918 may be defined dynamically, during system initialization or configuration, device initialization, and/or at the time of manufacture or assembly. The duration of each time slot 914, 916, 918 may be defined as a number or proportion of the clock pulses 942 transmitted during the push-pull mode period 908. The clock pulses transmitted in a time slot 914, 916, 918 may be used to time transmission of bits of VGI state by a corresponding slave device. The duration of each time slot 914, 916, 918 may be defined independently of one another. In the example, a first time slot 914 includes 8 clock pulses, a second time slot 916 is truncated and includes 2 clock pulses, and a third time slot 918 includes 10 clock pulses.

In some implementations, a slave device may signal whether it intends to transmit VGI state information at the commencement of its assigned time slot 914, 916, 918. In the illustrated example, the first bit interval 924, 926, 928 corresponding to the first clock pulse 934, 936, 938 of the clock pulses transmitted in the time slot 914, 916, 918 indicates whether the device intends to transmit state information. The first bit interval 924, 926, 928 may serve as a presence indicator when intention to transmit VGI state information is provided affirmatively. That is, a slave device that is hibernating, malfunctioning or otherwise inactive does not participate in the VGI state exchange 900 and is not in a state or condition to affirmatively signal intention to transmit VGI state information. Other devices coupled to the serial bus recognize that SDA 902 is not driven during the first bit interval 924, 926, 928 associated with the inactive device and recognize that no VGI state information is to be received during the corresponding time slot 914, 916, 918.

In the illustrated example, SDA 902 is low during the first bit interval 924, 928 of two time slots 914, 918 to indicate that VGI state information is being transmitted during the two time slots 914, 918, while SDA 902 is high during the first bit interval 926 of a third time slot 916 to indicate that no VGI state information is being transmitted during the third time slot 916. SDA 902 may be held high during the first bit interval 926 of the third time slot 916 by a keeper circuit or resistor. A keeper circuit may include a weak driver configured to drive SDA 902 based on a positive feedback representation of the signaling state of SDA 902. The output of the weak driver is easily overcome by a push-pull driver.

In some implementations, the state of the first bit interval 924, 926, 928 (i.e., the presence indicator) may be used to determine whether the corresponding time slot 914, 916, 918 can, or should be truncated. When a device does not intend to transmit VGI state information, then the number of clock pulses transmitted during the corresponding time slot 914, 916, 918 can be reduced. In the illustrated example, SDA 902 is high during the first bit interval 926 of a third time slot 916, indicating that no VGI state information is being transmitted during the third time slot 916. The number of pulses transmitted in the third time slot 916 is reduced to two. In some examples, only the first bit interval 926 of the third time slot 916 may be transmitted.

In some implementations, a master device may stretch the clock signal between one or more time slots 914, 916, 918 to support bus turnaround. In one example, a slave device that is transmitting in a first time slot 914, 916, 918 reconfigures its bus interface to receive data transmitted in the next time slot 914, 916, 918. In another example, a slave device that is receiving state information in a first time slot 914, 916, 918 reconfigures its bus interface to transmit data in the next time slot 914, 916, 918. Some slave devices may need additional time between time slots 914, 916, 918 to accomplish bus turnaround. The master device may be configured with information identifying a duration 940 between pulses to enable bus turnaround between time slots 914, 916, 918.

One or more devices may monitor the serial bus and each device may capture any bits of VGI state that is directed or relevant to one or more physical GPIO pins within the device. In one example, VGI state information may be exchanged between pairs of devices. For example, each bit of the state information transmitted in a time slot 914, 916, 918 may be consumed by a single device. In another example, one or more bits of the state information transmitted in a time slot 914, 916, 918 may be consumed by two or more devices. Each device that consumes VGI state information may be configured with information identifying the bits of VGI state information to be captured and mapping of each captured bit of VGI state information to a physical GPIO pin. Bits of VGI state information may be identified by time slot 914, 916, 918 and clock pulse within the time slot 914, 916, 918, by clock pulse number within the total set of clock pulses 942 transmitted during the push-pull mode period 908, using an offset value for example.

Figure 10:
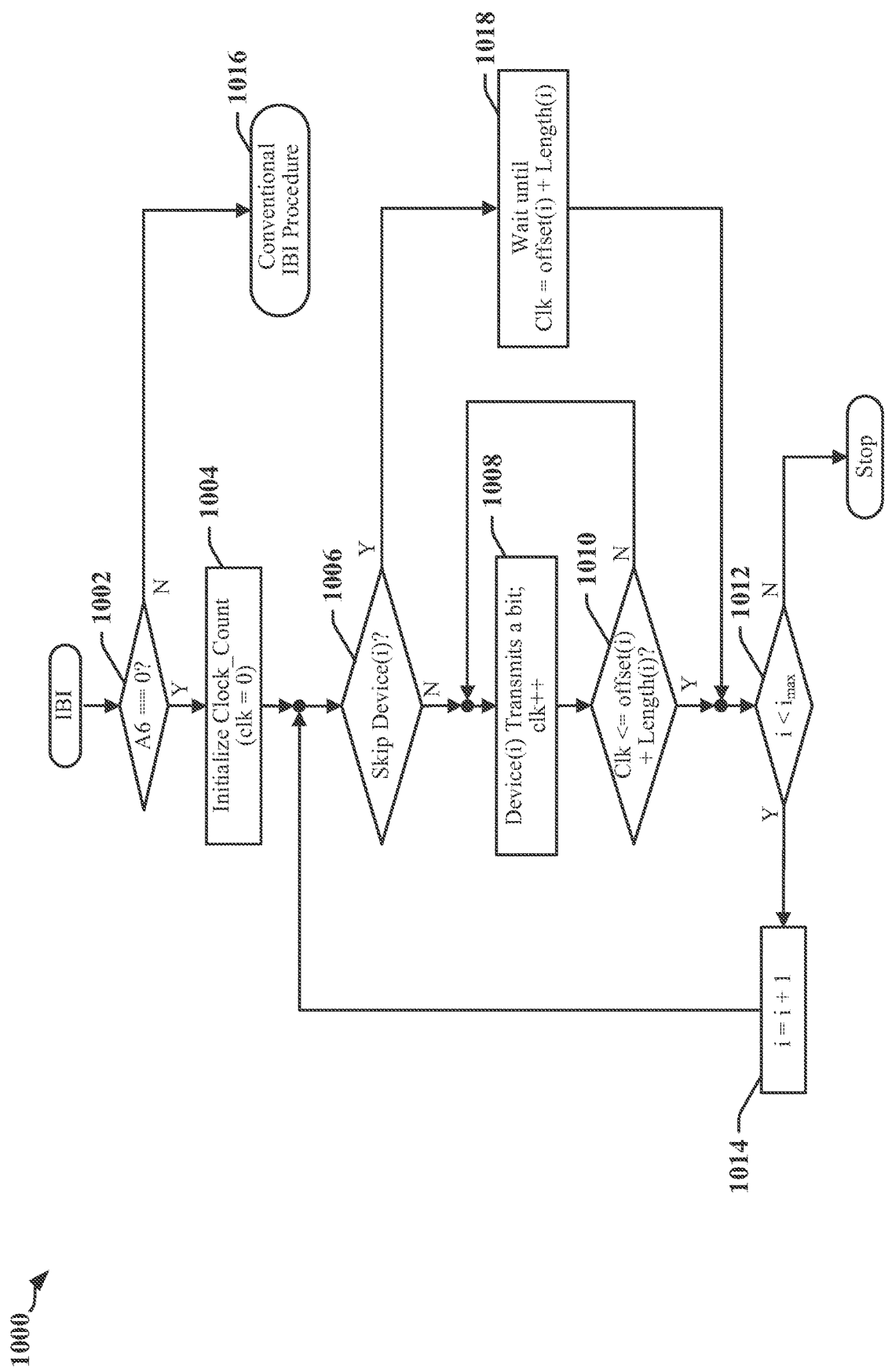
FIG. 10 is a first flowchart illustrating certain operations of a processing circuit adapted in accordance with certain aspects disclosed herein.

FIG. 10 is a flowchart 1000 illustrating a procedure for handling an in-band interrupt request in a system that uses n I3C serial bus to exchange VGI state. From a system perspective, multiple devices may be configured to provide VGI state information in slots, each slot having a length defined by a number, length(i), of push-pull clock pulses where 1<i<N in the examples illustrated in FIGS. 7-9. The start point of each slot within the clock pulses 724, 842, 942 transmitted during the push-pull mode period 708, 808, 908 may be defined as offset(i) for each slot, as illustrated in the table 750 of FIG. 7, for example.

The procedure may be initiated when an in-band interrupt request 710, 810, 910 is detected. At block 1002, it may be determined whether the in-band interrupt request 710, 810, 910 relates to a request to transfer VGI state information. When the first-transmitted address bit ([A6]) in the arbitration phase is set to logic '1', the in-band interrupt request 710, 810, 910 is treated as a conventional in-band interrupt request at block 1016. When the first-transmitted address bit ([A6]) in the arbitration phase is set to logic '0', the in-band interrupt request 710, 810, 910 is treated as a request to exchange VGI state and the procedure continues at block 1004, where a push-pull clock pulse counter is initiated. A push-pull clock pulse counter may be maintained by transmitters and receivers and used to identify beginning and ending of slots. In one example, the push-pull clock pulse counter may be used by a receiver to identify specific bits of VGI state that are of interest to the receiver.

At block 1006, the first bit of a current slot is transmitted. A transmitter assigned to the current slot may drive SDA 702, 802, 902 low when it intends to transmit VGI state information or drive SDA 702, 802, 902 high when it does not intend to transmit VGI state information. When the transmitter is inactive, SDA 702, 802, 902 may be maintained in the high state by a pull-up resistor or keeper circuit, indicating that no VGI state information will be transmitted in the current slot. A receiver circuit may monitor the first bit of the current slot to determine whether VGI state information may be available for capture in the current slot. When the first bit of the current slot is set to logic '1' (SDA 702, 802, 902 is high) at block 1006, then at block 1018, SDA 702, 802, 902 may be ignored while the clock pulses associated with the current slot are transmitted. In some implementations, the number clock pulses transmitted in the current slot may be truncated when the first bit of the current slot indicates that the device assigned to the current slot will not be transmitting state information in the current slot. After completion of the current slot, the procedure continues at block 1012.

When the first bit of the current slot is set to logic '0' (SDA 702, 802, 902 is low) at block 1006, then at block 1008 a device assigned to the current slot may transmit a bit of VGI state information for each additional clock pulse. The clock counter may be incremented for each bit transmitted in block 1008 and when the first bit of the current slot is transmitted.

At block 1010, it may be determined whether all clock pulses have been transmitted for the current slot. In one example, the clock counter may be compared to the offset identifying the start of the current slot added to the length of the current slot. If the clock counter is less, then another bit may be transmitted at block 1008. If the clock counter is greater, then the procedure continues at block 1012.

At block 1012, it is determined whether any additional slots remain to be transmitted. The value of i may be compared to its maximum value configured for the system. The maximum value of i=N in the examples illustrated in FIGS. 7-9. When additional slots are to be transmitted, the procedure continues at block 1014, where i is incremented. When no additional slots remain to be transmitted, the procedure may be terminated by the master device, which may transmit a STOP condition 720, 820, 920.

Examples of Processing Circuits and Methods

Figure 11:
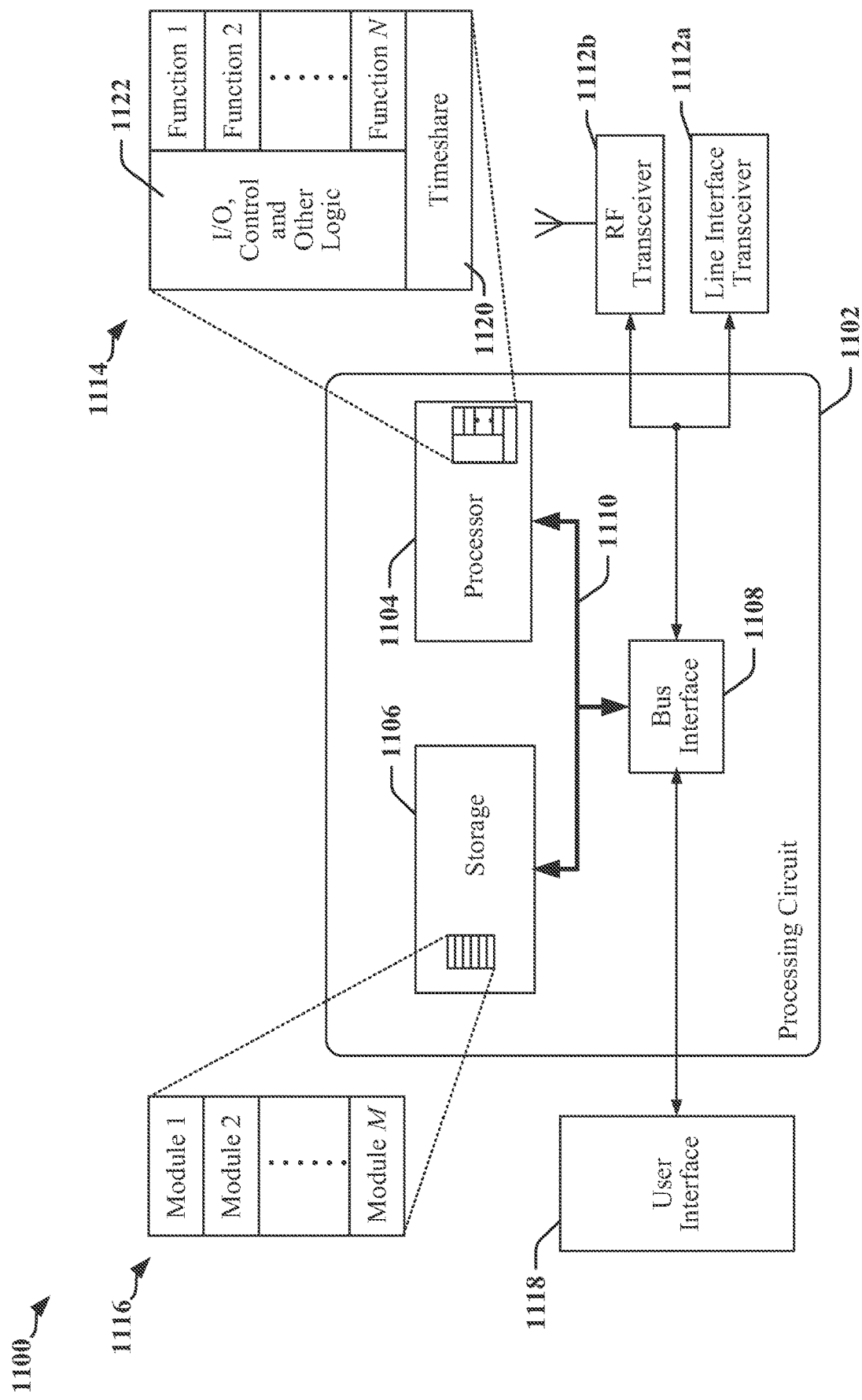
FIG. 11 illustrates an example of an apparatus employing a processing circuit that may be adapted according to certain aspects disclosed herein.

FIG. 11 is a diagram illustrating an example of a hardware implementation for an apparatus 1100 that may include, employ and/or implement a finite state machine, including for example the VGI FSMs 410, 426, 432, 438 of FIG. 4, to exchange virtual GPIO state generated by multiple sources and/or directed to multiple destinations. In some examples, the apparatus 1100 may configure the operation of the finite state machine. In some examples, the apparatus 1100 may perform one or more functions disclosed herein. In accordance with various aspects of the disclosure, an element, or any portion of an element, or any combination of elements as disclosed herein may be implemented using a processing circuit 1102. The processing circuit 1102 may include one or more processors 1104 that are controlled by some combination of hardware and software modules. Examples of processors 1104 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable media and/or processor-readable media. The bus 1110 may also link various other circuits such as timing sources, timers, peripherals, voltage regulators, and power management circuits. A bus interface 1108 may provide an interface between the bus 1110 and one or more transceivers 1112*a*, 1112*b*. A transceiver 1112*a*, 1112*b* may be provided for each networking technology supported by the processing circuit. In some instances, multiple networking technologies may share some or all of the circuitry or processing modules found in a transceiver 1112*a*, 1112*b*. Each transceiver 1112*a*, 1112*b* provides a means for communicating with various other apparatus over a transmission medium. In one example, a transceiver 1112*a* may be used to couple the apparatus 1100 to a multi-wire bus. In another example, a transceiver 1112*b* may be used to connect the apparatus 1100 to a radio access network. Depending upon the nature of the apparatus 1100, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer-readable medium. The external computer-readable medium and/or storage 1106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. Computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as the one or more transceivers 1112*a*, 1112*b*, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to the one or more transceivers 1112*a*, 1112*b*, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the one or more transceivers 1112*a*, 1112*b*, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Figure 12:
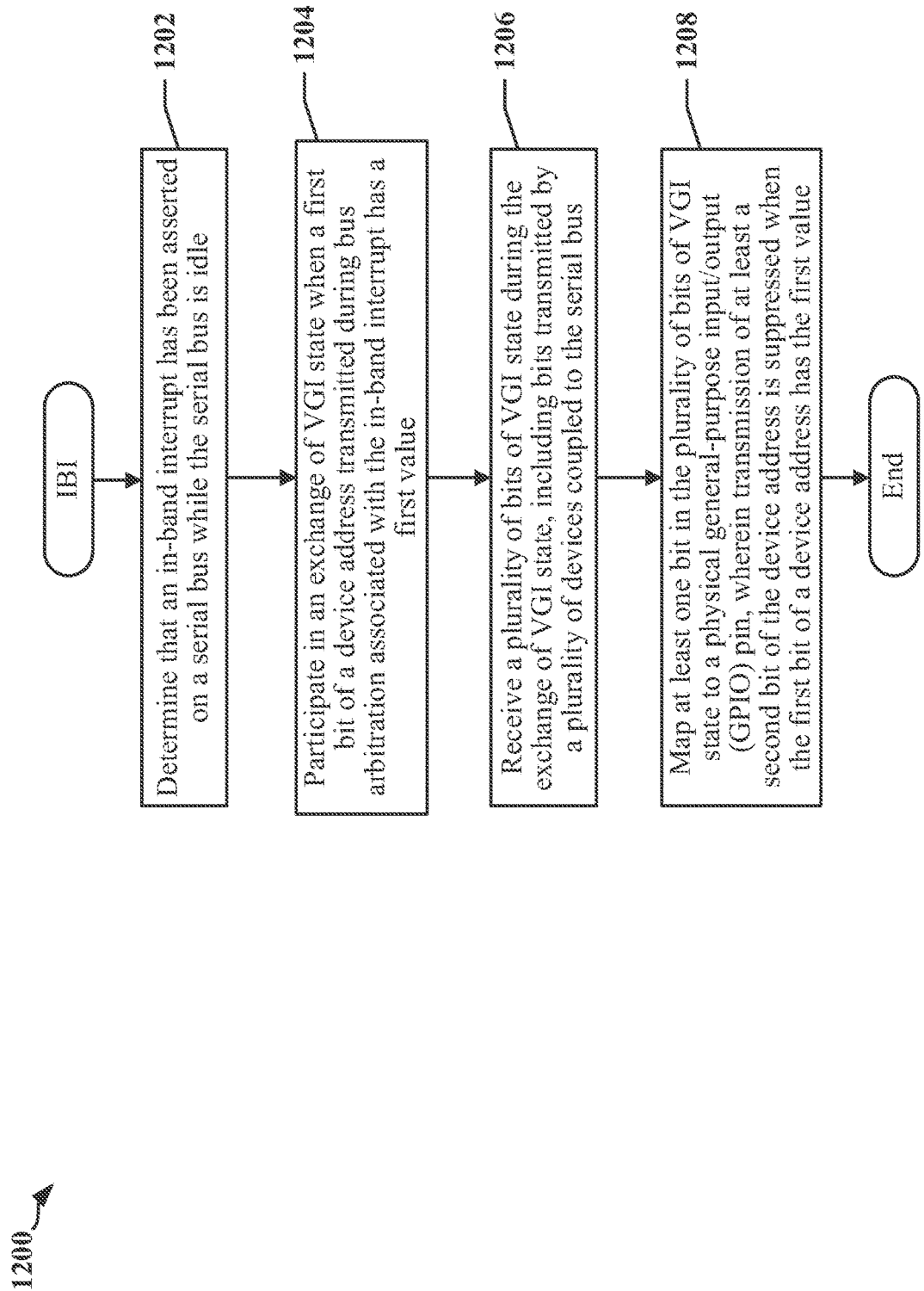
FIG. 12 is a second flowchart illustrating certain operations of a processing circuit adapted in accordance with certain aspects disclosed herein.

FIG. 12 is a flowchart 1200 illustrating an example of a method for facilitating communication of VGI state information messages over a multi-drop bus. In one example, the multi-drop bus is a serial bus operated in accordance with an I3C protocol. The device may be a bus master or a slave device.

At block 1202, the device may determine that an in-band interrupt has been asserted on the serial bus while the serial bus is idle.

At block 1204, the device may participate in an exchange of VGI state when a first bit of a device address transmitted during bus arbitration associated with the in-band interrupt has a first value. One or more bits of VGI state may be transmitted during the exchange of VGI state.

At block 1206, the device may receive a plurality of bits of VGI state during the exchange of VGI state, including bits transmitted by a plurality of devices coupled to the serial bus.

At block 1208, the device may map at least one bit in the plurality of bits of VGI state to a physical general-purpose input/output (GPIO) pin. Transmission of at least a second bit of the device address may be suppressed when the first bit of a device address has the first value. The at least one bit in the plurality of bits of VGI state may be mapped to the physical GPIO pin by defining voltage state of the physical GPIO pin based on value of the at least one bit.

In certain examples, the device may be one of the plurality of devices is configured to transmit VGI state information in a slot that has a slot size defined in terms of a first number of clock pulses in a clock signal transmitted over the serial bus. The device may be configured with a location of the slot with respect to the first bit of the device address defined in terms of a second number of clock pulses in the clock signal. A first bit of the VGI state information may indicate whether the slot includes valid bits of VGI state. The device may refrain from transmitting all of the first number of clock pulses in the slot when the first bit of the VGI state information indicates that the slot includes no valid bits of VGI state.

In some examples, the device may configure one or more line drivers coupling a master device to the serial bus for a push-pull mode of operation after the first bit of the device address has been transmitted with the first value. The first bit of the device address may be transmitted by a slave device while the one or more line drivers are in an open-drain mode of operation. The device may transmit a first clock signal having a first frequency on the serial bus while the first bit of the device address is being transmitted by the slave device. The device may transmit a second clock signal having a second frequency on the serial bus after the first bit of the device address has been transmitted, where the second frequency is greater than the first frequency. The second clock signal may provide a number of clock pulses defining a duration of the exchange of VGI state.

Figure 13:
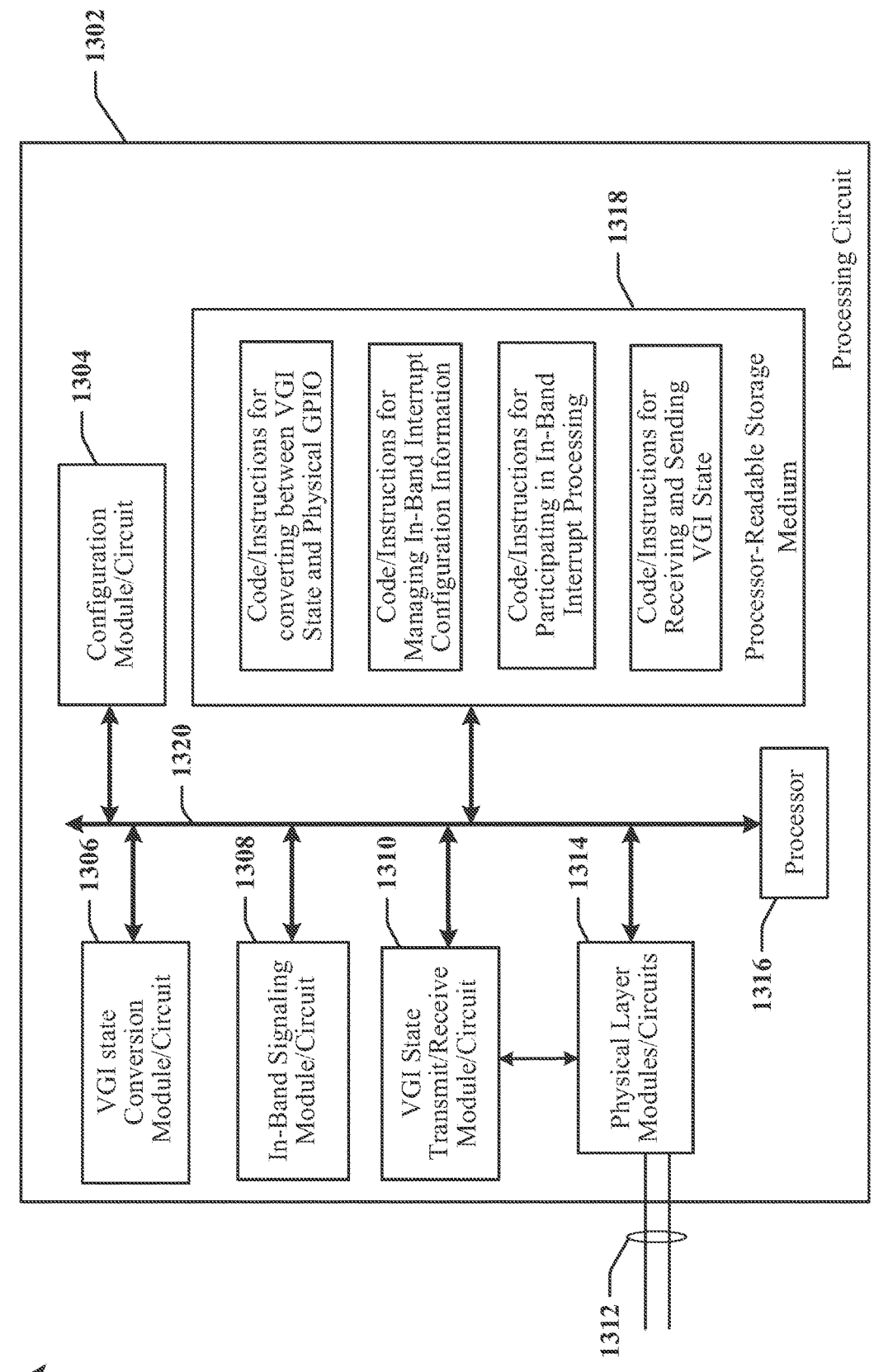
FIG. 13 illustrates a first example of a hardware implementation for an apparatus adapted in accordance with certain aspects disclosed herein.

FIG. 13 is a diagram illustrating an example of a hardware implementation for an apparatus 1300 employing a processing circuit 1302. The apparatus may implement a bridging circuit in accordance with certain aspects disclosed herein. The processing circuit typically has a controller, finite state machine and/or processor 1316 that may include one or more microprocessors, microcontrollers, digital signal processors, sequencers and/or state machines. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the controller, finite state machine and/or processor 1316, the modules or circuits 1304, 1306, 1308, and 1310 and the processor-readable storage medium 1318. One or more physical layer circuits and/or modules 1314 may be provided to support communications over a communication link implemented using a multi-wire bus 1312 or other communication structure. The bus 1320 may also link various other circuits such as timing sources, peripherals, voltage regulators, and power management circuits, which are well known in the art, and therefore, will not be described any further.

The processing circuit 1302 is responsible for general processing, including the execution of software, code and/or instructions stored on the processor-readable storage medium 1318. The processor-readable storage medium may include a non-transitory storage medium. The software, when executed by the controller, finite state machine and/or processor 1316, causes the processing circuit 1302 to perform the various functions described supra for any particular apparatus. The processor-readable storage medium may be used for storing data that is manipulated by the controller, finite state machine and/or processor 1316 when executing software. The processing circuit 1302 further includes at least one of the modules 1304, 1306, 1308, and 1310. The modules 1304, 1306, 1308 and 1310 may be software modules running in the controller, finite state machine and/or processor 1316, resident/stored in the processor-readable storage medium 1318, one or more hardware modules coupled to the controller, finite state machine and/or processor 1316, or some combination thereof. The modules 1304, 1306, 1308, and 1310 may include microcontroller instructions, state machine configuration parameters, or some combination thereof.

In one configuration, the apparatus 1300 includes modules and/or circuits 1304 configured to maintain, update, modify and otherwise manage in-band interrupt transmission slot configurations used for communicating VGI state information, modules and/or circuits 1306 configured to convert between VGI state information and physical GPIO state, modules and/or circuits 1308 configured to generate and monitor in-band signaling including signaling associated with in-band interrupt requests and handling, and modules and/or circuits 1306 configured to transmit and receive VGI state information in slots defined for in-band interrupt handling in accordance with certain aspects disclosed herein.

In one example, the apparatus 1300 includes a plurality of GPIO pins, an interface adapted to couple the apparatus to a serial bus, and a processing circuit 1302. The processing circuit 1302 may be configured to determine that an in-band interrupt has been asserted on the serial bus while the serial bus is idle, participate in an exchange of VGI state when a first bit of a device address transmitted during bus arbitration associated with the in-band interrupt has a first value, receive a plurality of bits of VGI state during the exchange of VGI state, including bits transmitted by a plurality of devices coupled to the serial bus, and map at least one bit in the plurality of bits of VGI state to a GPIO pin. Transmission of at least a second bit of the device address may be suppressed when the first bit of a device address has the first value.

The processing circuit 1302 may be further configured to transmit one or more bits of VGI state during the exchange of VGI state. The processing circuit 1302 may be further configured to define voltage state of the physical GPIO pin based on value of the at least one bit.

In some examples, a first device in the plurality of devices is configured to transmit VGI state information in a slot that has a slot size defined in terms of a first number of clock pulses in a clock signal transmitted over the serial bus. The first device may be configured with a location of the slot with respect to the first bit of the device address defined in terms of a second number of clock pulses in the clock signal. A first bit of the VGI state information may indicate whether the slot includes valid bits of VGI state. The processing circuit 1302 may be further configured to refrain from transmitting all of the first number of clock pulses in the slot when the first bit of the VGI state information indicates that the slot includes no valid bits of VGI state. The processing circuit 1302 may be further configured to configure one or more line drivers coupling a master device to the serial bus for a push-pull mode of operation after the first bit of the device address has been transmitted. The first bit of the device address is transmitted by a slave device while the one or more line drivers are in an open-drain mode of operation. The processing circuit 1302 may be further configured to transmit a first clock signal having a first frequency on the serial bus while the first bit of the device address is being transmitted by the slave device, and transmit a second clock signal having a second frequency on the serial bus after the first bit of the device address has been transmitted. The second frequency may be greater than the first frequency. The second clock signal may provide a number of clock pulses defining a duration of the exchange of VGI state.

In certain examples, the processor-readable storage medium 1318 is a non-transitory storage medium that maintains data and/or instructions that, when executed by one or more processors 1316, cause the one or more processors 1316 to determine that an in-band interrupt has been asserted on a serial bus while the serial bus is idle, participate in an exchange of VGI state when a first bit of a device address transmitted during bus arbitration associated with the in-band interrupt has a first value, receive a plurality of bits of VGI state during the exchange of VGI state, including bits transmitted by a plurality of devices coupled to the serial bus, and define voltage state of a physical GPIO pin based on value of at least one bit in the plurality of bits of VGI state. Transmission of at least a second bit of the device address is suppressed when the first bit of a device address has the first value.

The processor-readable storage medium 1318 may maintains data and/or instructions that causes the one or more processors 1316 to transmit one or more bits of VGI state during the exchange of VGI state.

In one example, a first device in the plurality of devices is configured to transmit VGI state information in a slot that has a slot size defined in terms of a first number of clock pulses in a clock signal transmitted over the serial bus. The first device may be configured with a location of the slot with respect to the first bit of the device address defined in terms of a second number of clock pulses in the clock signal. A first bit of the VGI state information may indicate whether the slot includes valid bits of VGI state.

In another example, the processor-readable storage medium 1318 may maintains data and/or instructions that causes the one or more processors 1316 to configure one or more line drivers coupling a master device to the serial bus for a push-pull mode of operation after the first bit of the device address has been transmitted. The first bit of the device address may be transmitted by a slave device while the one or more line drivers are in an open-drain mode of operation.

The processor-readable storage medium 1318 may maintains data and/or instructions that causes the one or more processors 1316 to transmit a first clock signal having a first frequency on the serial bus while the first bit of the device address is being transmitted by a slave device, and transmit a second clock signal having a second frequency on the serial bus after the first bit of the device address has been transmitted. The second frequency may be greater than the first frequency. The second clock signal may provide a number of clock pulses defining a duration of the exchange of VGI state.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for facilitating communication of virtual general-purpose input/output (VGI) over a serial bus, comprising:

determining that an in-band interrupt has been asserted on the serial bus while the serial bus is idle;

participating in an exchange of VGI state when a first bit of a device address transmitted during bus arbitration associated with the in-band interrupt has a first value;

receiving a plurality of bits of VGI state during the exchange of VGI state, including bits transmitted by a plurality of devices coupled to the serial bus; and mapping at least one bit in the plurality of bits of VGI state to a physical general-purpose input/output (GPIO) pin, wherein transmission of at least a second bit of the device address is suppressed when the first bit of the device address has the first value.

2. The method of claim 1, further comprising:
transmitting one or more bits of VGI state during the exchange of VGI state.

3. The method of claim 1, wherein mapping the at least one bit in the plurality of bits of VGI state to the physical GPIO pin comprises:
defining voltage state of the physical GPIO pin based on value of the at least one bit.

4. The method of claim 1, wherein a first device in the plurality of devices is configured to transmit VGI state information in a slot that has a slot size defined in terms of a first number of clock pulses in a clock signal transmitted over the serial bus.

5. The method of claim 4, wherein the first device is configured with a location of the slot with respect to the first bit of the device address defined in terms of a second number of clock pulses in the clock signal.

6. The method of claim 5, wherein a first bit of the VGI state information indicates whether the slot includes valid bits of VGI state.

7. The method of claim 6, further comprising:
refraining from transmitting all of the first number of clock pulses in the slot when the first bit of the VGI state information indicates that the slot includes no valid bits of VGI state.

8. The method of claim 1, further comprising:
configuring one or more line drivers coupling a master device to the serial bus for a push-pull mode of operation after the first bit of the device address has been transmitted with the first value,
wherein the first bit of the device address is transmitted by a slave device while the one or more line drivers are in an open-drain mode of operation.

9. The method of claim 8, further comprising:
transmitting a first clock signal having a first frequency on the serial bus while the first bit of the device address is being transmitted by the slave device; and
transmitting a second clock signal having a second frequency on the serial bus after the first bit of the device address has been transmitted with the first value, wherein the second frequency is greater than the first frequency.

10. The method of claim 9, wherein the second clock signal provides a number of clock pulses defining a duration of the exchange of VGI state.

11. An apparatus comprising:
a plurality of general-purpose input/output (GPIO) pins;
an interface adapted to couple the apparatus to a serial bus; and
a processing circuit configured to:
determine that an in-band interrupt has been asserted on the serial bus while the serial bus is idle;
participate in an exchange of virtual GPIO (VGI) state when a first bit of a device address transmitted during bus arbitration associated with the in-band interrupt has a first value;
receive a plurality of bits of VGI state during the exchange of VGI state, including bits transmitted by a plurality of devices coupled to the serial bus; and
map at least one bit in the plurality of bits of VGI state to a physical general-purpose input/output (GPIO) pin,
wherein transmission of at least a second bit of the device address is suppressed when the first bit of the device address has the first value.

12. The apparatus of claim 11, wherein the processing circuit is further configured to:
transmit one or more bits of VGI state during the exchange of VGI state.

13. The apparatus of claim 11, wherein the processing circuit is further configured to:
define voltage state of the physical GPIO pin based on value of the at least one bit.

14. The apparatus of claim 11, wherein a first device in the plurality of devices is configured to transmit VGI state information in a slot that has a slot size defined in terms of a first number of clock pulses in a clock signal transmitted over the serial bus.

15. The apparatus of claim 14, wherein the first device is configured with a location of the slot with respect to the first bit of the device address defined in terms of a second number of clock pulses in the clock signal.

16. The apparatus of claim 15, wherein a first bit of the VGI state information indicates whether the slot includes valid bits of VGI state.

17. The apparatus of claim 16, wherein the processing circuit is further configured to:
refrain from transmitting all of the first number of clock pulses in the slot when the first bit of the VGI state information indicates that the slot includes no valid bits of VGI state.

18. The apparatus of claim 11, wherein the processing circuit is further configured to:
configure one or more line drivers coupling a master device to the serial bus for a push-pull mode of operation after the first bit of the device address has been transmitted with the first value,
wherein the first bit of the device address is transmitted by a slave device while the one or more line drivers are in an open-drain mode of operation.

19. The apparatus of claim 18, wherein the processing circuit is further configured to:
transmit a first clock signal having a first frequency on the serial bus while the first bit of the device address is being transmitted by the slave device; and
transmit a second clock signal having a second frequency on the serial bus after the first bit of the device address has been transmitted with the first value, wherein the second frequency is greater than the first frequency.

20. The apparatus of claim 19, wherein the second clock signal provides a number of clock pulses defining a duration of the exchange of VGI state.

21. A non-transitory processor-readable storage medium comprising instructions that, when executed by one or more processors, cause the one or more processors to:
determine that an in-band interrupt has been asserted on a serial bus while the serial bus is idle;
participate in an exchange of virtual GPIO (VGI) state when a first bit of a device address transmitted during bus arbitration associated with the in-band interrupt has a first value;

receive a plurality of bits of VGI state during the exchange of VGI state, including bits transmitted by a plurality of devices coupled to the serial bus; and define voltage state of a physical general-purpose input/output (GPIO) pin based on value of at least one bit in the plurality of bits of VGI state, wherein transmission of at least a second bit of the device address is suppressed when the first bit of the device address has the first value.

22. The storage medium of claim 21, further comprising instructions that cause the one or more processors to:

transmit one or more bits of VGI state during the exchange of VGI state.

23. The storage medium of claim 21, wherein a first device in the plurality of devices is configured to transmit VGI state information in a slot that has a slot size defined in terms of a first number of clock pulses in a clock signal transmitted over the serial bus, wherein the first device is configured with a location of the slot with respect to the first bit of the device address defined in terms of a second number of clock pulses in the clock signal, and wherein a first bit of the VGI state information indicates whether the slot includes valid bits of VGI state.

24. The storage medium of claim 21, further comprising instructions that cause the one or more processors to:

configure one or more line drivers coupling a master device to the serial bus for a push-pull mode of operation after the first bit of the device address has been transmitted with the first value, wherein the first bit of the device address is transmitted by a slave device while the one or more line drivers are in an open-drain mode of operation.

25. The storage medium of claim 21, further comprising instructions that cause the one or more processors to:

transmit a first clock signal having a first frequency on the serial bus while the first bit of the device address is being transmitted by a slave device; and transmit a second clock signal having a second frequency on the serial bus after the first bit of the device address has been transmitted with the first value, wherein the second frequency is greater than the first frequency, wherein the second clock signal provides a number of clock pulses defining a duration of the exchange of VGI state.

26. An apparatus comprising:

means for determining that an in-band interrupt has been asserted on a serial bus while the serial bus is idle, wherein the apparatus is configured to participate in an exchange of virtual GPIO (VGI) state when a first bit of a device address transmitted during bus arbitration associated with the in-band interrupt has a first value;

means for receiving a plurality of bits of VGI state during the exchange of VGI state, including bits transmitted by a plurality of devices coupled to the serial bus; and means for defining voltage state of a physical general-purpose input/output (GPIO) pin based on value of at least one bit in the plurality of bits of VGI state, wherein transmission of at least a second bit of the device address is suppressed when the first bit of the device address has the first value.

27. The apparatus of claim 26, further comprising:

means for transmitting one or more bits of VGI state during the exchange of VGI state.

28. The apparatus of claim 26, wherein a first device in the plurality of devices is configured to transmit VGI state information in a slot that has a slot size defined in terms of a first number of clock pulses in a clock signal transmitted over the serial bus, wherein the first device is configured with a location of the slot with respect to the first bit of the device address defined in terms of a second number of clock pulses in the clock signal, and wherein a first bit of the VGI state information indicates whether the slot includes valid bits of VGI state.

29. The apparatus of claim 26, further comprising:

means for configuring one or more line drivers coupling a master device to the serial bus for a push-pull mode of operation after the first bit of the device address has been transmitted with the first value, wherein the first bit of the device address is transmitted by a slave device while the one or more line drivers are in an open-drain mode of operation.

30. The apparatus of claim 26, further comprising:

means for transmitting clock signals on the serial bus, wherein a first clock signal having a first frequency is transmitted on the serial bus while the first bit of the device address is being transmitted by a slave device, and a second clock signal having a second frequency is transmitted on the serial bus after the first bit of the device address has been transmitted with the first value, wherein the second frequency is greater than the first frequency, and wherein the second clock signal provides a number of clock pulses defining a duration of the exchange of VGI state.

\* \* \* \* \*